(12) United States Patent
Levenson et al.

(10) Patent No.: US 7,131,005 B2
(45) Date of Patent: *Oct. 31, 2006

(54) METHOD AND SYSTEM FOR COMPONENT AUTHENTICATION OF A VEHICLE

(75) Inventors: Samuel M. Levenson, Arlington Heights, IL (US); John D. Bruner, South Barrington, IL (US); Ezzat A. Dabbish, Cary, IL (US); Walton L. Fehr, Mundelein, IL (US); Larry C. Puhl, West Dundee, IL (US); Jurgen Reinold, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 853 days.

This patent is subject to a terminal disclaimer.

(21) Appl. No.: 10/184,760

(22) Filed: Jun. 28, 2002

(65) Prior Publication Data

US 2004/0003231 A1    Jan. 1, 2004

(51) Int. Cl.
| | |
|---|---|
| *G05B 23/00* | (2006.01) |
| *G06F 7/00* | (2006.01) |
| *H04L 9/00* | (2006.01) |
| *G06F 19/00* | (2006.01) |

(52) U.S. Cl. .................. 713/170; 340/5.8; 701/29; 701/32
(58) Field of Classification Search ............... 713/168, 713/170; 701/29, 32; 340/5.8
See application file for complete search history.

(56) References Cited

U.S. PATENT DOCUMENTS

| 4,280,185 A | 7/1981 | Martin |
| 4,993,068 A | 2/1991 | Piosenka |
| 5,220,604 A | 6/1993 | Gasser |
| 5,375,243 A | 12/1994 | Parzych |
| 5,469,363 A | 11/1995 | Saliga |
| 5,719,950 A | 2/1998 | Osten |
| 5,794,164 A | 8/1998 | Beckert |
| 5,802,199 A | 9/1998 | Pare |
| 5,805,712 A | 9/1998 | Davis |
| 5,808,375 A | 9/1998 | Armbruster |
| 5,838,251 A | 11/1998 | Brinkmeyer |

(Continued)

FOREIGN PATENT DOCUMENTS

DE        3739670        8/1989

(Continued)

OTHER PUBLICATIONS

Tennenhouse, D. L. et al., "Towards an Active network Architecture". [Online] Available http://www.tns.lcs.mit.edu/, as document http://www.acm.org/sigs/sigcomm/ccr/archive/1996/apr96/ccr-9604-tennenhouse.pdf.

(Continued)

*Primary Examiner*—Jacques Louis-Jacques
*Assistant Examiner*—Matthew Heneghan
(74) *Attorney, Agent, or Firm*—Indira Saladi; Gary J. Cunningham

(57) ABSTRACT

A component for use in a prospective vehicle obtains from a certification authority a certification that an authentic vehicle is associated with a cryptographic key. The certification certifies that the cryptographic key is bound to information identifying the authentic vehicle. The component utilizes the cryptographic key obtained from the certification authority in cryptographic communication with the prospective vehicle, and determines whether the prospective vehicle is the authentic vehicle based on whether the cryptographic key is successfully utilized in the cryptographic communication. Upon determining the prospective vehicle is the authentic vehicle, the component may allow the prospective vehicle to operate the component.

20 Claims, 15 Drawing Sheets

U.S. PATENT DOCUMENTS

| | | | |
|---|---|---|---|
| 5,847,661 A | 12/1998 | Ricci | |
| 5,991,408 A | 11/1999 | Pearson | |
| 5,991,429 A | 11/1999 | Coffin | |
| 6,032,257 A | 2/2000 | Olarig | |
| 6,160,903 A | 12/2000 | Hamid | |
| 6,192,130 B1 | 2/2001 | Otway | |
| 6,236,909 B1 | 5/2001 | Colson | |
| 6,311,272 B1 | 10/2001 | Gressel | |
| 6,317,026 B1 | 11/2001 | Brodine | |
| 6,425,081 B1 | 7/2002 | Iwamura | |
| 6,496,595 B1 | 12/2002 | Puchek | |
| 6,505,100 B1 | 1/2003 | Stuempfle et al. | |
| 6,554,669 B1 | 4/2003 | Motosko | |
| 6,625,729 B1 | 9/2003 | Angelo | |
| 6,647,323 B1 | 11/2003 | Robinson | |
| 6,731,195 B1 | 5/2004 | Nemoto | |
| 6,754,183 B1 | 6/2004 | Razavi | |
| 6,816,971 B1 | 11/2004 | Schmidt | |
| 6,826,690 B1 | 11/2004 | Hind | |
| 6,839,710 B1 * | 1/2005 | Dabbish et al. | 380/255 |
| 6,842,762 B1 | 1/2005 | Raithel | |
| 6,907,445 B1 | 6/2005 | Pellegrino | |
| 6,952,768 B1 | 10/2005 | Wray | |
| 2001/0022615 A1 | 9/2001 | Fernandez | |
| 2001/0049787 A1 | 12/2001 | Morikawa | |
| 2002/0023223 A1* | 2/2002 | Schmidt et al. | 713/187 |
| 2002/0049904 A1 | 4/2002 | Nowottnick | |
| 2002/0194476 A1 | 12/2002 | Lewis et al. | |
| 2003/0009271 A1 | 1/2003 | Akiyama | |
| 2003/0009710 A1 | 1/2003 | Grant | |
| 2003/0013438 A1 | 1/2003 | Darby | |
| 2003/0055666 A1 | 3/2003 | Roddy | |
| 2003/0056578 A1 | 3/2003 | Mitchell | |
| 2003/0067541 A1 | 4/2003 | Joao | |
| 2003/0088771 A1 | 5/2003 | Merchen | |

FOREIGN PATENT DOCUMENTS

| | | |
|---|---|---|
| DE | 10029634 | 12/2001 |
| DE | 10141737 | 4/2003 |
| EP | 0723892 | 7/1996 |
| EP | 0723896 | 7/1996 |
| EP | 1128265 | 8/2001 |
| FR | 2774120 | 7/1999 |
| JP | 10188062 | 12/1996 |
| WO | WO0077692 | 12/2000 |
| WO | WO0189133 | 11/2001 |
| WO | WO0206932 | 1/2002 |
| WO | WO0215523 | 2/2002 |
| WO | WO0237745 | 5/2002 |

OTHER PUBLICATIONS

Tennenhouse, D.L. et al., "A Survey of Active network Research", IEEE Communications Magazine, Jan. 1997, 0163-6804/97, 1997 IEEE, pp. 80-86.

Stallings, William. "Cryptography and Network Security", Prentice Hall, Inc., Jul. 4, 1998, $2^{nd}$ Edition, pp. 163-206, 299-353.

Menezes, Handbook of Applied Cryptography, 1997 by CRC Press, pp. 403-405, 509-512, 559-561.

Leen, "Digital Networks in the Automotive Vehicle", Automotive Electronics, pp. 257-266.

ASE Automobile Technician Tests, ASE Automobile Preparation Guide (Web Version), pp. 1-15.

* cited by examiner

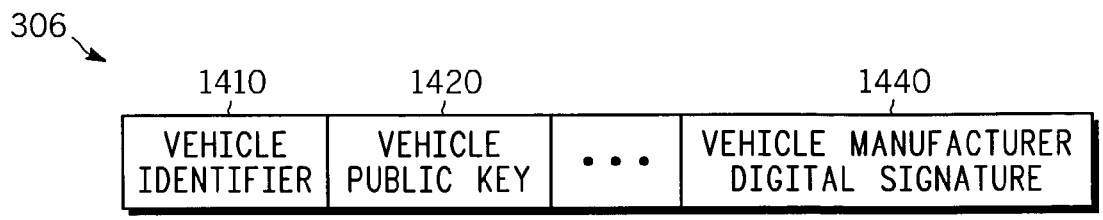
FIG. 14
FIG. 15
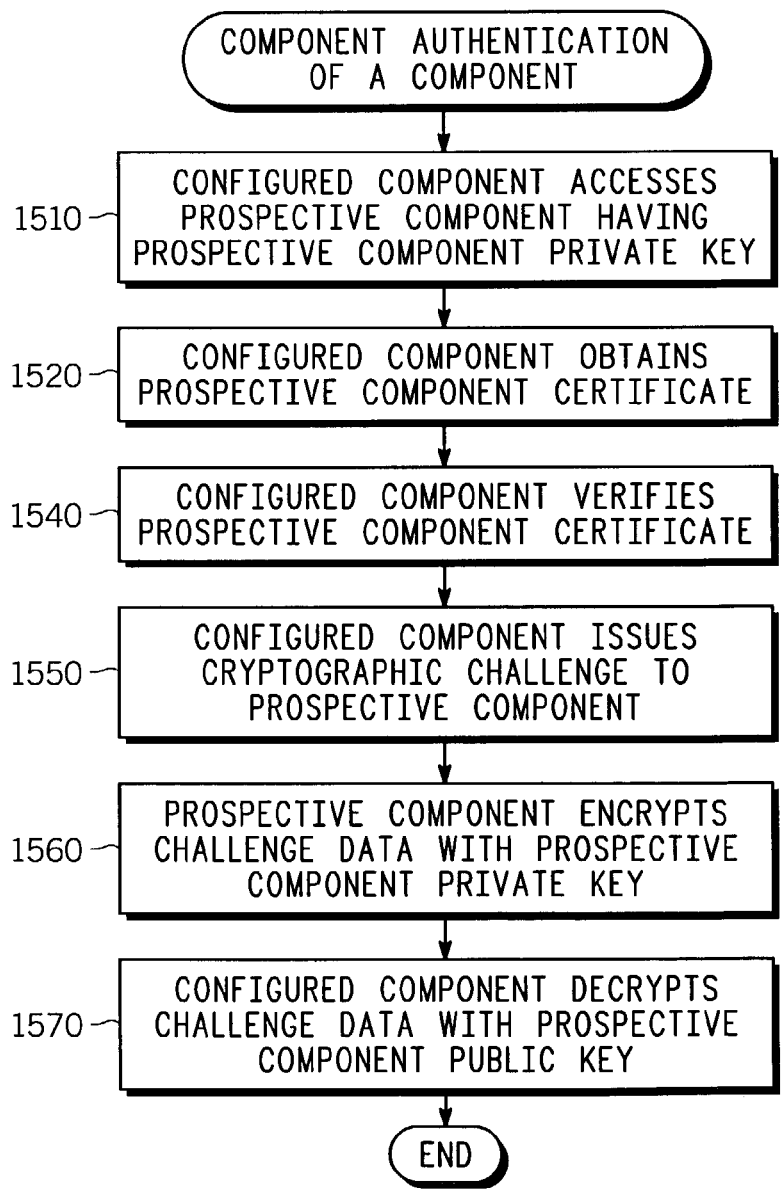

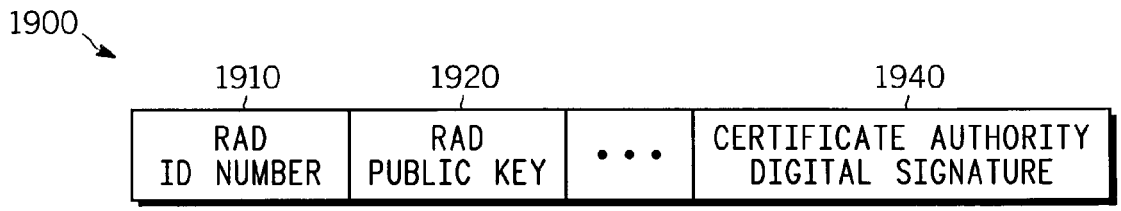
*FIG. 19*
*FIG. 20*
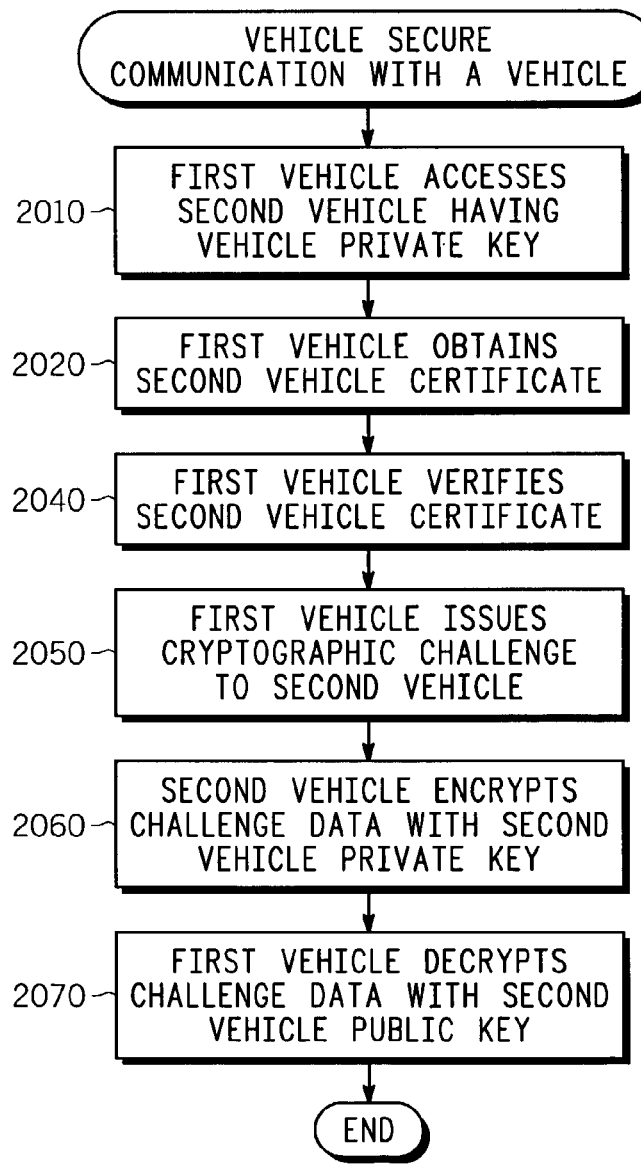

METHOD AND SYSTEM FOR COMPONENT AUTHENTICATION OF A VEHICLE

RELATED APPLICATIONS

The present invention is related to the following applications which are assigned to the same assignee as the present invention:

METHOD AND SYSTEM FOR VEHICLE AUTHENTICATION OF A COMPONENT, filed Jun. 28, 2002, having Ser. No. 10/184,530;

METHOD AND SYSTEM FOR COMPONENT OBTAINMENT OF VEHICLE AUTHENTICATION, filed Jun. 28, 2002, having Ser. No. 10/184,571;

METHOD AND SYSTEM FOR VEHICLE AUTHENTICATION OF A COMPONENT USING KEY SEPARATION, filed Jun. 28, 2002, having Ser. No. 10/184,570;

METHOD AND SYSTEM FOR VEHICLE AUTHENTICATION OF A COMPONENT CLASS, filed Jun. 28, 2002, having Ser. No. 10/186,351;

METHOD AND SYSTEM FOR MULTIPLE SCOPE AUTHENTICATION OF VEHICLE COMPONENTS, filed Jun. 28, 2002, having Ser. No. 10/186,370;

METHOD AND SYSTEM FOR VEHICLE AUTHENTICATION OF A SUBASSEMBLY, filed Jun. 28, 2002, having Ser. No. 10/186,373;

METHOD AND SYSTEM FOR SUBASSEMBLY AUTHENTICATION OF A COMPONENT, filed Jun. 28, 2002, having Ser. No. 10/184,787;

METHOD AND SYSTEM FOR VEHICLE COMPONENT AUTHENTICATION OF ANOTHER COMPONENT, filed Jun. 28, 2002, having Ser. No. 10/184,786;

METHOD AND SYSTEM FOR VEHICLE AUTHENTICATION OF A REMOTE ACESS DEVICE, filed Jun. 28, 2002, having Ser. No. 10/184,745;

METHOD AND SYSTEM FOR VEHICLE AUTHENTICATION OF ANOTHER VEHICLE, filed Jun. 28, 2002, having Ser. No. 10/184,746;

METHOD AND SYSTEM FOR VEHICLE AUTHENTICATION OF A SERVICE TECHNICIAN, filed Jun. 28, 2002, having Ser. No. 10/184,747;

METHOD AND SYSTEM FOR TECHNICIAN AUTHENTICATION OF A VEHICLE, filed Jun. 28, 2002, having Ser. No. 10/185,127;

METHOD AND SYSTEM FOR VEHICLE AUTHORIZATION OF A SERVICE TECHNICIAN, filed Jun. 28, 2002, having Ser. No. 10/185,107;

METHOD AND SYSTEM FOR AUTHORIZING RECONFIGURATION OF A VEHICLE, filed Jun. 28, 2002, having Ser. No. 10/185,126;

METHOD AND SYSTEM FOR MAINTAINING A CONFIGURATION HISTORY OF A VEHICLE, filed Jun. 28, 2002, having Ser. No. 10/185,130.

FIELD OF THE INVENTION

The present invention relates to vehicles and, more particularly, to the configuration of vehicles.

BACKGROUND OF THE INVENTION

Modern vehicles contain a number of configuration elements including components such as engine controllers, transmission controllers, brake controllers, HVAC components, steering controllers, components for lights, door locks, and wipers, and components relating to audio, video and telecommunications. Appropriate configuration of these configuration elements within a vehicle is very important. The configuration elements of the vehicle must be compatible with the vehicle and with each other to ensure safe and effective operation of that vehicle.

During production, the vehicle is within the direct control of the manufacturer, who can thus ensure an appropriate initial configuration by predesignating the configuration elements for use with each vehicle. However, after the vehicle is manufactured and sold, the manufacturer cannot know what specific configuration elements might be introduced into the configuration, how and by whom, as the vehicle manufacturer can no longer directly control the configuration. Similarly, a component manufacturer of a component not predesignated for use with a vehicle or other configuration element cannot know in advance what specific vehicles or specific configuration elements the component will be configured with, and how and by whom it will be so configured.

Accordingly, there is a need for an effective means of controlling vehicle configuration and configuration elements beyond manufacture and throughout the life of the vehicle.

BRIEF DESCRIPTION OF THE DRAWINGS

The invention is described in terms of several preferred embodiments set out below and with reference to the following drawings in which like reference numerals are used to refer to like elements throughout.

FIG. 14 is a block diagram illustrating a vehicle certificate in accordance with an embodiment of the present invention;

FIG. 15 is a flowchart of the process of component authentication of a component in accordance with an embodiment of the present invention;

FIG. 19 is a block diagram illustrating a remote access device certificate in accordance with an embodiment of the present invention;

FIG. 20 is a flowchart of the process of secure communication among vehicles in accordance with an embodiment of the present invention;

DETAILED DESCRIPTION OF THE PREFERRED EMBODIMENTS

The present invention provides an effective means of controlling configuration of a vehicle with respect to a component with which a vehicle or other component is not predesignated for use. Only some uses of a component in a vehicle configuration would be considered desirable by the component manufacturer. For example, the installation of a component in an inappropriate vehicle or configuration could cause the vehicle or component to operate unsafely or otherwise degrade the performance of the vehicle or component.

During manufacture of a component not predesignated for use with a particular vehicle, component or configuration, the component manufacturer cannot predict what type of vehicle or configuration into which one might later attempt to install the component. Thus, the present invention provides a method and system for component authentication of a vehicle. A component for use in a prospective vehicle obtains from a certification authority a certification that an authentic vehicle is associated with a cryptographic key. The certification certifies that the cryptographic key is bound to information identifying the authentic vehicle. The component utilizes the cryptographic key obtained from the certification authority in cryptographic communication with the prospective vehicle, and determines whether the prospective vehicle is the authentic vehicle based on whether the cryptographic key is successfully utilized in the cryptographic communication. Upon determining the prospective vehicle is the authentic vehicle, the component may allow the prospective vehicle to operate the component.

By providing a means for a vehicle to be authenticated by a component not predesignated for use in the vehicle, the invention provides a number of advantages. For example, a component manufacturer of the component is able to maintain control of the brand of vehicle in which it is installed. Additionally, the component manufacturer can ensure that the component is not installed in a stolen vehicle or a vehicle for which it was not designed, preventing potential damage the component or vehicle or a reduction in capability or quality of performance.

Vehicle Environment

Figure 1:
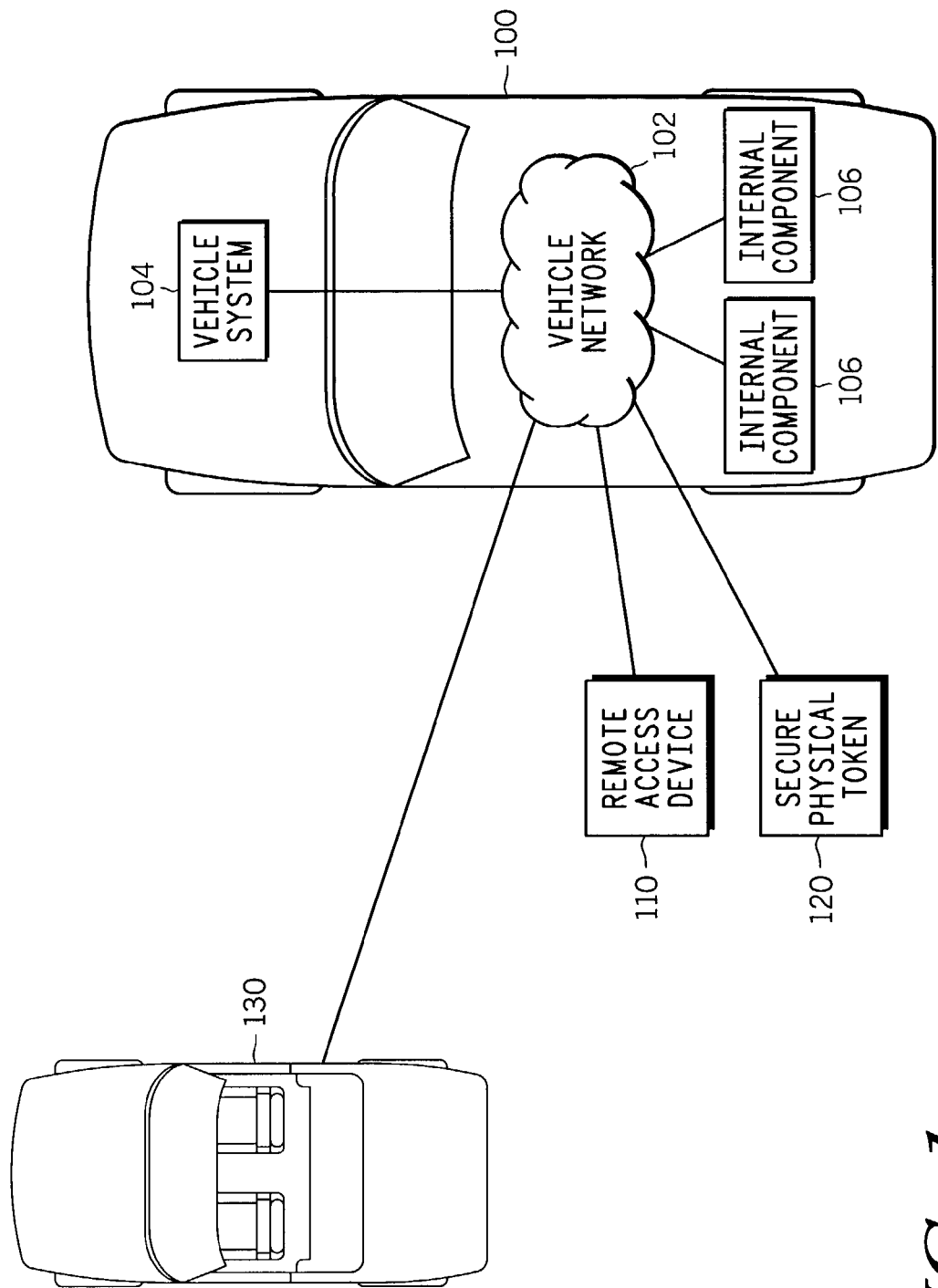
FIG. 1 is a block diagram illustrating a vehicle environment in accordance with an embodiment of the present invention.

A vehicle environment will now be described which includes an implementation of an embodiment of the invention. Referring to the drawings, FIG. 1 illustrates a vehicle 100 having a vehicle network 102 which connects configuration elements of the vehicle. The configuration elements include a vehicle system 104 and a number of components including internal components 106 and external components that potentially extend beyond the body of the vehicle, such as a remote access device 110, a secure physical token 120 and an external vehicle 130.

The vehicle 100 is, for example, a commercially available automobile such as a car or truck, but may include any type of commercially available vehicle. The vehicle network 102 can be, for example, a vehicle active network as is described in U.S. patent application Ser. Nos. 09/945,581, 09/944,892, 09/943,908, 09/943,870, 09/943,882, 09/944,653, 09/944,893, 09/944,887, 09/943,921, 09/944,891, 09/943,914, and U.S. Pat. No. 6,747,365. The vehicle active network described in the above patents provides the capability of communicatively connecting components in potentially multiple locations via potentially multiple communication paths through a number of active network elements. Utilizing this implementation in the vehicle environment described herein provides a flexible configuration into which components not fully contemplated during design and manufacture of a vehicle can be installed, replaced, upgraded, and so forth in a modular fashion.

Returning to FIG. 1, the vehicle system 104 includes the capability of representing the vehicle in interaction with other configuration elements in the vehicle configuration, and may perform a number of vehicle-related functions including secure storage of vehicle related data. The vehicle system 104 may be a centralized vehicle system or may be distributed throughout the vehicle network 102. The internal components 106 may include any of a number of hardware, firmware or software elements within the vehicle including, but not limited to, engine controllers, transmission controllers, brake controllers, HVAC components, steering controllers, components for lights, door locks, and wipers, and components relating to audio, video, telematics and communications.

Figure 2:
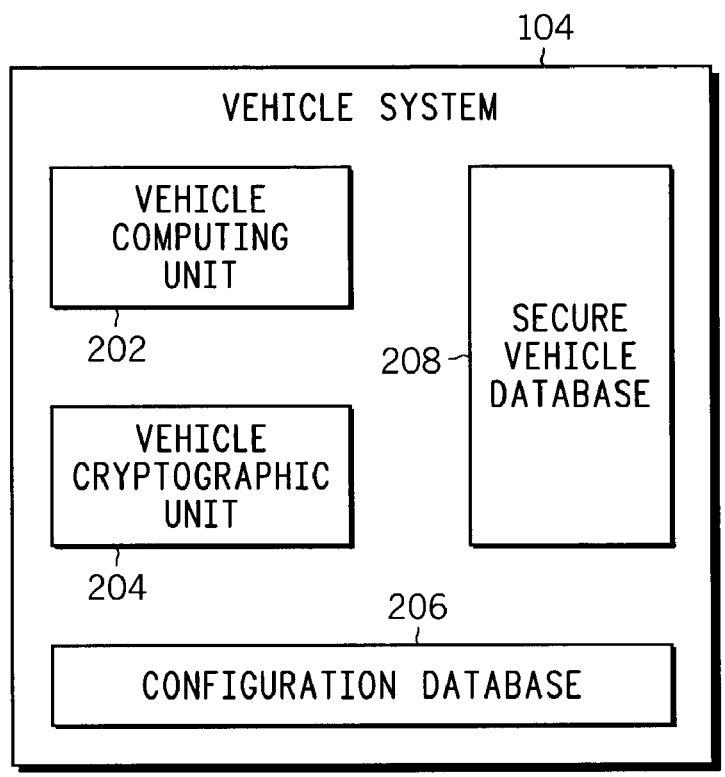
FIG. 2 is a block diagram illustrating a vehicle system in accordance with an embodiment of the present invention.

FIG. 2 illustrates the vehicle system 104 in more detail. The vehicle system 104 includes a vehicle computing unit 202. The vehicle computing unit 202 may perform a variety of computing functions and may include a number of elements such as a processor, input/output unit, memory and so forth, which can be either commercially available or specialized elements, depending on the circumstances and needs at hand. The vehicle system 104 also includes a vehicle cryptographic unit 204. The vehicle cryptographic unit 204 performs cryptographic functions of the vehicle system 104, such as encryption, decryption, key establishment, signature and verification. Additionally, the vehicle system 104 includes a configuration database 206 which stores data related to the configuration of components in the vehicle 100. The vehicle system 104 further includes a secure vehicle database 208 which stores data relating to the vehicle such as control data, authentication data and authorization data. The secure vehicle database 208 provides varying levels of data security, potentially from minimal to maximal, where and as warranted by the type of data.

Figure 3:
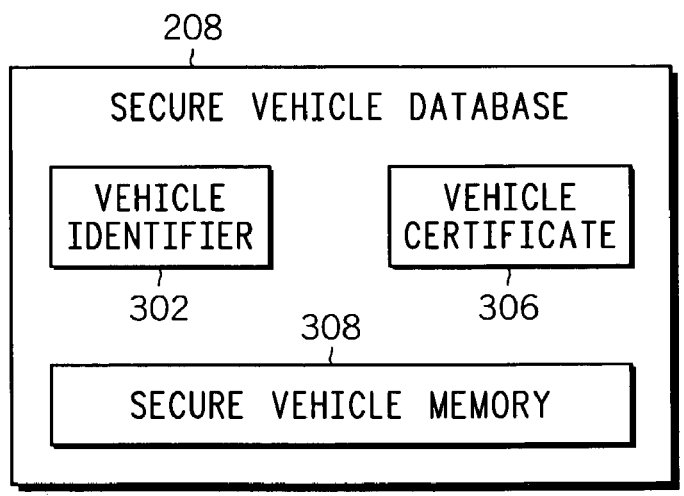
FIG. 3 is a block diagram illustrating a secure vehicle database in accordance with an embodiment of the present invention.

FIG. 3 shows the secure vehicle database 208 in greater detail. The secure vehicle database 208 stores a vehicle identifier 302 which uniquely represents the vehicle 100. The vehicle identifier 302 is, for example, a uniquely identifiable set of alphanumeric characters identifying the vehicle 100. The secure vehicle database 208 stores the vehicle identification number 302 with read only access such that the vehicle identification number cannot be altered. The secure vehicle database 208 additionally stores a vehicle certificate 306 which certifies the vehicle 100. The secure vehicle database 208 also has a secure vehicle memory 308 which stores data related to the vehicle 100, such as certificates certifying configuration elements related to the vehicle 100. The secure vehicle memory 308 may store data with varying levels of security, potentially from minimal to maximal, where and as warranted by the type of data.

Figure 4:
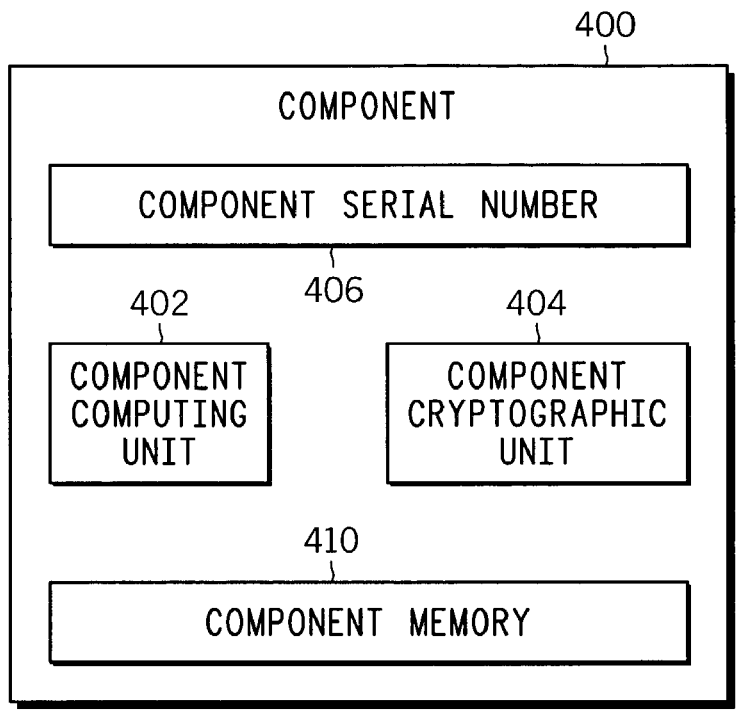
FIG. 4 is a block diagram illustrating a vehicle component in accordance with an embodiment of the present invention.

FIG. 4 illustrates a component 400 of the vehicle network 102. The component 400 may be an internal component 106, or may be included in an internal component 106, or may be an external component or portion thereof, such as the remote access device 110, secure physical token 120 or external vehicle 130. The component 400 includes a component computing unit 402 which, similar to the vehicle computing unit 202, may perform a variety of computing functions and may include a number commercially available or specialized elements such as a processor, input/output unit, memory, and so forth. The component 400 also includes a component cryptographic unit 404. The component cryptographic unit 404 performs cryptographic functions such as encryption, decryption, key establishment, signature and verification.

The component 400 additionally includes a component serial number 406. The component serial number 406 is, for example, a number or alphanumeric string which uniquely identifies the component 400 or a component class to which the component 400 belongs. The component 400 stores the component serial number 406 with read-only access such that the component serial number cannot be altered. The component 400 may also have a component memory 410 which stores additional data related to the component 400, the vehicle 100, and so forth.

Figure 5:
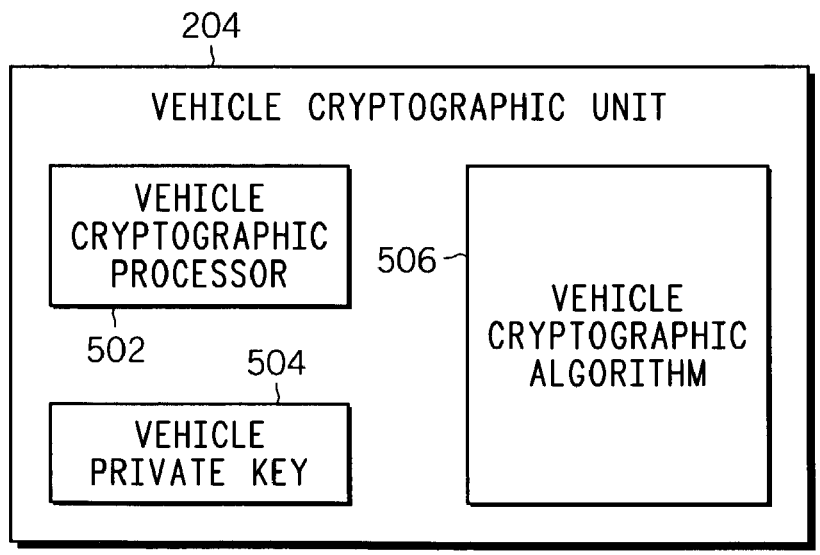
FIG. 5 is a block diagram illustrating a vehicle cryptographic unit in accordance with an embodiment of the present invention.

FIG. 5 shows the vehicle cryptographic unit 204 in more detail. The vehicle cryptographic unit 204 includes a vehicle cryptographic processor 502 which applies a vehicle private key 504 to execute a vehicle cryptographic algorithm 506. The vehicle private key 504 is utilized by the vehicle cryptographic algorithm 506 in cryptographic communication, such as to authenticate the vehicle 100 to a component 400, and potentially for other purposes such an ongoing communication with components. The vehicle private key 504 is accessible only by the vehicle cryptographic processor 502 and is, for example, a private cryptographic key for use in public key cryptography.

The vehicle cryptographic unit 204 provides highly secure data storage in order to protect the vehicle private key 504. For example, the vehicle cryptographic unit 204 may be designed to encapsulate the vehicle cryptographic processor 502, vehicle cryptographic algorithm 506 and vehicle private key 504 together in a sealed unit that cannot be accessed by leads and cannot be opened without destroying or permanently inactivating the vehicle cryptographic unit 204. The vehicle cryptographic unit 204 may further be designed to prevent or obfuscate the emission of identifiable bit patterns from the vehicle cryptographic unit 204 which could otherwise be utilized to identify the vehicle private key 504. One of ordinary skill in the art will recognize various approaches for providing secure storage depending on the requirements at hand. An example secure memory and processing system is described, for example, in patent application Ser. No. 09/671,949.

Figure 6:
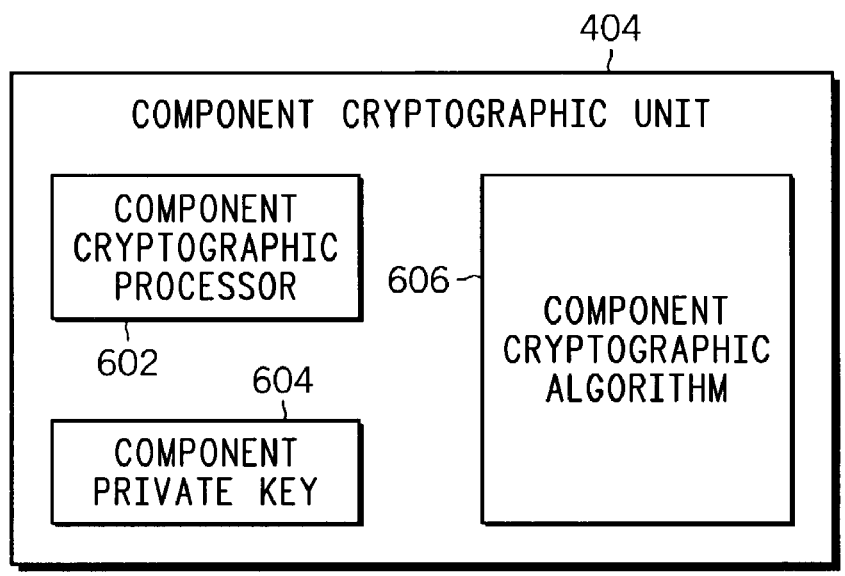
FIG. 6 is a block diagram illustrating a component cryptographic unit in accordance with an embodiment of the present invention.

FIG. 6 shows the component cryptographic unit 404 in more detail. The component cryptographic unit 404 includes a component cryptographic processor 602 which applies a component private key 604 to execute a component cryptographic algorithm 606. The component private key 604 is utilized by the component cryptographic algorithm 606 in cryptographic communication, such as to authenticate the component 400 within which it is provided to other configuration elements such as the vehicle system 104 or other components, and potentially for other purposes such an ongoing communication with other configuration elements. The component private key 604 is accessible only by the component cryptographic processor 602 and is, for example, a private encryption key for use in public key cryptography.

Like the vehicle cryptographic unit 204, the component cryptographic unit 404 provides highly secure data storage in order to protect the component private key 604. The component cryptographic unit 404 may be designed to encapsulate the component cryptographic processor 602, component cryptographic algorithm 606 and component private key 604 together in a sealed unit that cannot be accessed by leads and cannot be opened without destroying or permanently inactivating the component cryptographic unit 404. The component cryptographic unit 404 may further be designed to prevent or obfuscate the emission of identifiable bit patterns from the component cryptographic unit 404 which could otherwise be utilized to identify the component private key 604.

Configuration Control

As introduced above, the present invention provides a means of controlling vehicle configuration beyond manufacture and throughout the life of the vehicle. The specification describes the invention in the context of several main novel aspects of configuration control which relate to the invention and related inventions referenced above. These novel aspects include authentication, authorization and configuration management. Authentication as described herein involves the process of ensuring a vehicle, component or individual performing an operation with respect thereto is the entity it is identified and expected to be. Authorization involves determining whether a configuration element is allowed in the configuration or a function related to a configuration element or the vehicle configuration is allowed to be performed. Configuration management as provided herein involves maintaining a history of configuration functions for the configuration elements in the vehicle, and/or a history of service operations performed on the vehicle and the service technicians who have performed them.

Figure 7:
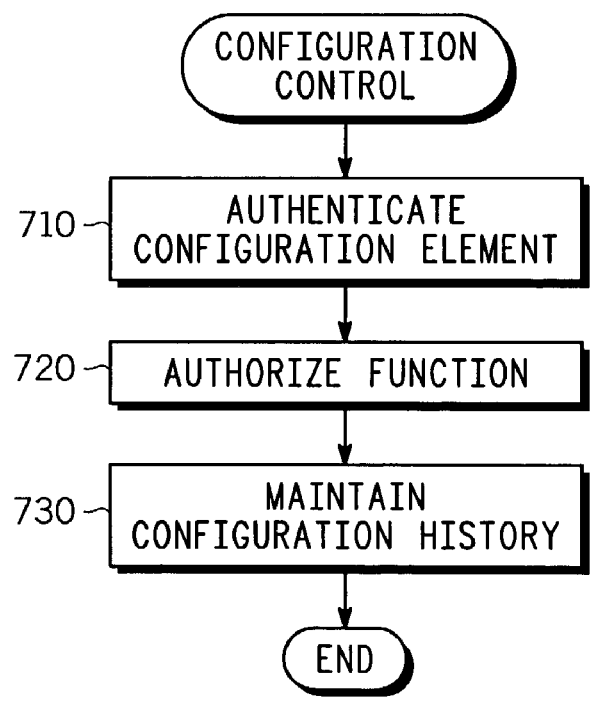
FIG. 7 is a flowchart showing novel aspects of configuration control.

FIG. 7 illustrates an example process which includes these novel aspects of configuration control. In step 710, a vehicle, component or individual related thereto first authenticates a configuration element. For example, the vehicle 100 may authenticate a prospective component 400 for installation in the vehicle 100. In step 720, upon authenticating the configuration element, a function related to the configuration element is authorized. For example, the vehicle 100 may authorize installation of the prospective component 400 by referring to the configuration database 206 and determining the component 400 is authorized to be installed in the vehicle 100 based on the current configuration of the vehicle as indicated in the configuration database 206.

In step 730, the configuration of vehicle 100 is continually maintained by tracking what configuration elements are in a current configuration of the vehicle 100 at a given time, reconfiguration functions that alter the configuration and when they occur, and by tracking what service operations have been performed on the vehicle 100 and by what service technicians. For example, the vehicle 100 records installation of the prospective component 400 in the configuration database 206. Although FIG. 7 is shown as a flowchart having these aspects in the order described above, it is noted that any number and combination of these elements may occur in potentially different orders in the various novel aspects of configuration control as provided herein Authentication As introduced above, one novel aspect of configuration control as provided herein is authentication of configuration elements of the vehicle configuration. As will be described, a configuration element, vehicle or service technician can be authenticated by autonomous operation by a vehicle or configuration element in the configuration. As a result, a vehicle or component manufacturer can ensure the configuration element, vehicle or service technician is the entity it is identified to be, even after manufacture and sale of the vehicle or component.

A number of novel types of authentication provided herein involve authentication performed by the vehicle. One such type of authentication is vehicle authentication of a component, which can be generally described as follows. A vehicle obtains a prospective component for use in the vehicle. The prospective component may be obtained directly from a component manufacturer or component supplier, or indirectly through one or more other entities. The vehicle also obtains from a certification authority a certification that an authentic component is associated with a cryptographic key. An authentic component is a component whose identifying information and other attributes are true, as is vouched for by a certification authority that can be trusted as a reliable source.

The certification authority could be a component supplier or manufacturer, or another certification authority such as a conventional public certification authority or specialized entity specific to the industry or a segment thereof. The certification authority could also itself be certified by a second certification authority, which could in turn be certified by a third certification authority, and so on.

The certification may be obtained directly or indirectly from the certification authority. It may be provided as data stored on the component or external to the component. The certification certifies that the cryptographic key is bound to information identifying the authentic component, and may be implemented, for example, with a digital certificate obtained from a certificate authority. The certification may also include a digital signature of the certification authority. The certification may certify that a component having an identified attribute such as a component serial number, an identified component supplier or other attribute is associated with the cryptographic key. The cryptographic key may be a public cryptographic key corresponding to a private key of the authentic component, which could be accessible only by the authentic component.

The vehicle utilizes the cryptographic key obtained from the certification authority in cryptographic communication with the prospective component, and determines whether the prospective component is the authentic component based on whether the cryptographic key is successfully utilized in the cryptographic communication. For example, the cryptographic key corresponds to a secret key of the authentic component, such that successful decryption using the cryptographic key ensures that data could only be from the authentic component. Upon determining the prospective component is the authentic component, the vehicle may allow the prospective component to become operative within the vehicle.

As with other novel types of authentication that will be described below, the cryptographic communication utilized in authentication can be any type of symmetric or asymmetric cryptography. Asymmetric key cryptography is advantageous for authentication, as it can be performed once to reliably establish authenticity for long-term use. It is also especially beneficial for the prospective entity to use a secret key, as explained above. Public key cryptography is particularly effective for the novel types of authentication described herein since the authenticating entity can utilize a public key which is easy to obtain without compromising security, while the prospective entity can use a corresponding private key securely stored by the prospective entity. Alternatively, symmetric key cryptography may be applied for authentication or other purposes, as it provides a different set advantages such as requiring less of acomputational burden.

The above process may be performed by the vehicle by, for example, a vehicle system having a cryptographic unit which utilizes the cryptographic key in cryptographic communication and a computing unit which determines whether the prospective component is the authentic component. The vehicle may additionally determine that the certification authority is authorized to certify the authentic component, such as by accessing a dynamic list that was prestored and remains rewritable by the vehicle manufacturer or applying a prestored root key to verify the digital signature of the certification authority.

Also, the general process of a vehicle authenticating a component is described above in terms of the process performed by the vehicle. From the perspective of the component, the process can also be viewed as a component obtaining vehicle authentication. The prospective component stores a first cryptographic key and utilizes the first cryptographic key in cryptographic communication with the vehicle, which determines whether the component is authentic in the manner described above. The prospective component may then obtain authorization from the vehicle to become operative upon successfully utilizing the first key in cryptographic communication with the vehicle.

Figure 8:
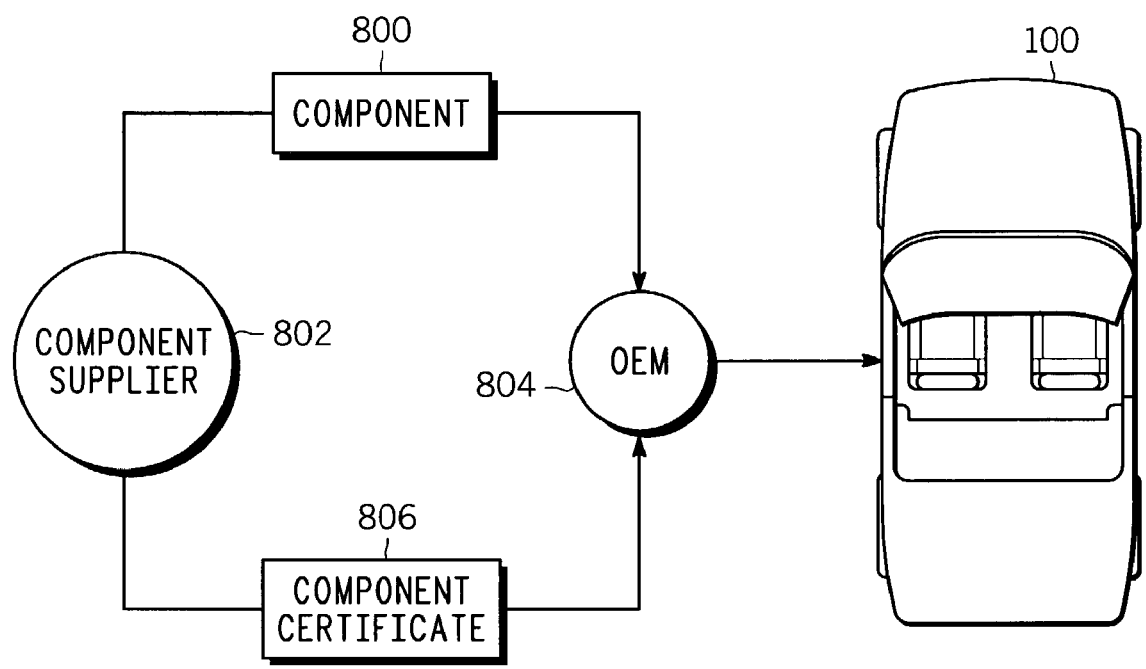
FIG. 8 is a block diagram illustrating an environment in which a component is authenticated in accordance with an embodiment of the present invention.
Figure 9:
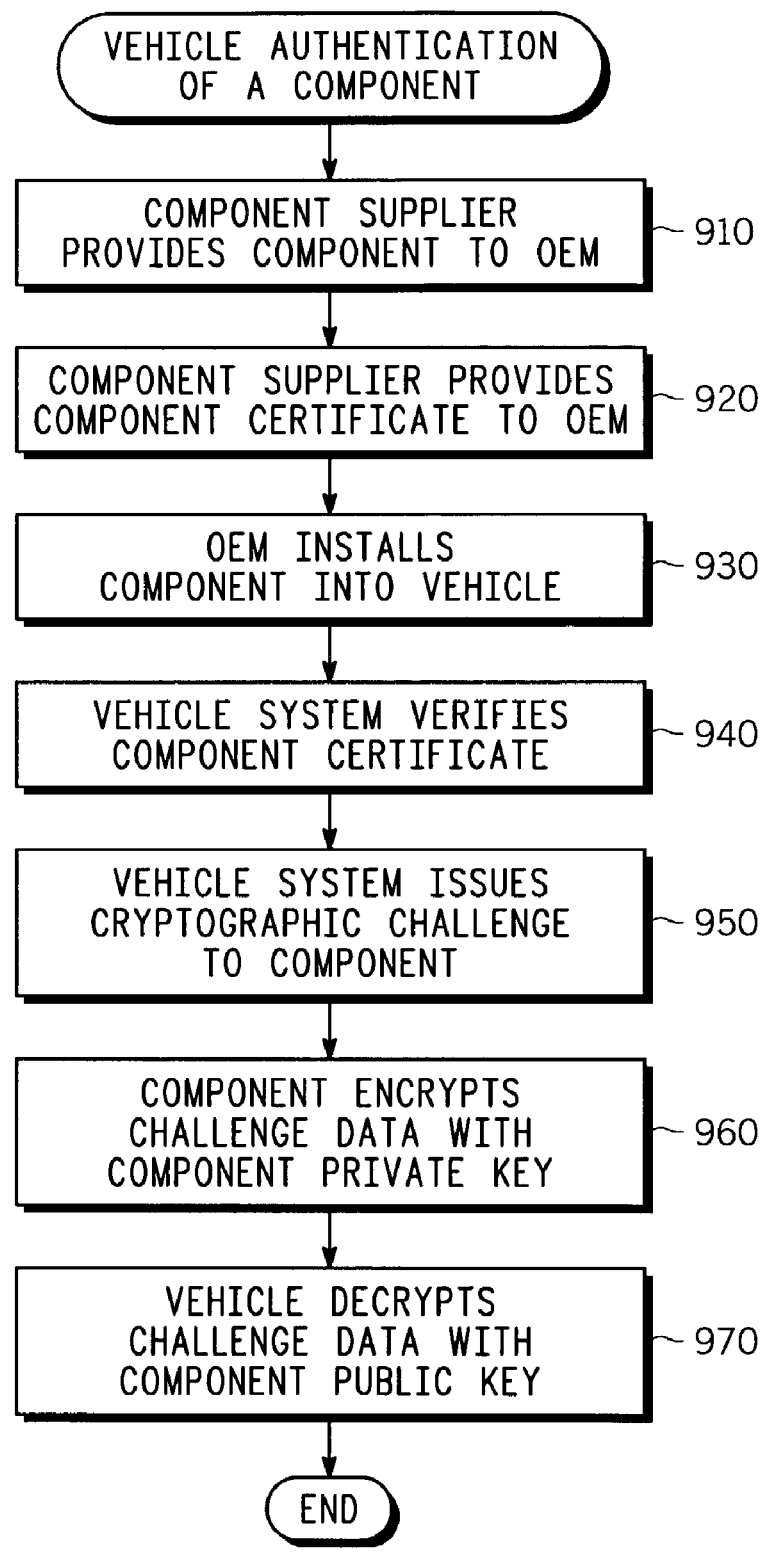
FIG. 9 is a flowchart of the process of vehicle authentication of a component in accordance with an embodiment of the present invention.

Returning to the perspective of the vehicle, as a more specific example, FIGS. 8 and 9 illustrate a potential embodiment of vehicle authentication of a component 800 as described above. FIG. 8 illustrates a physical implementation and FIG. 9 illustrates a corresponding process of the potential embodiment. In step 910, a component supplier 502 provides the component 800 (describe previously as 400) to an original equipment manufacturer (OEM) 804 a prospective component which is implemented, for example, as the component 400 as described herein. In step 920, the component supplier 802 provides a component certificate 806 to the original equipment manufacturer 804 which certifies the component 800. The component certificate 806 may be stored as data on the component 800 in, for example, the component memory 410. Alternatively, the component certificate 806 may be external to the component 800.

Figure 10:
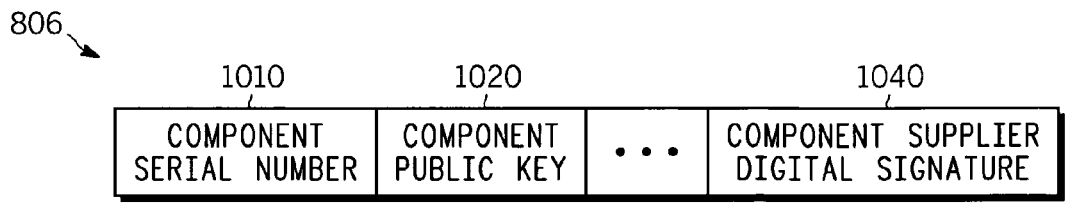
FIG. 10 is a block diagram illustrating a component certificate in accordance with an embodiment of the present invention.

The component certificate 806 is a digital certificate which is certified by the component supplier as a certificate authority. FIG. 10 shows a potential embodiment of the component certificate 806. The component certificate 806 includes a component serial number 1010 that matches the component serial number 406 for the component 400 it certifies. The component certificate 806 further includes a component public key 1020 which corresponds to the component private key 604 in the component 400 it certifies. The component certificate 806 also includes, potentially in addition to other component certificate fields, a component supplier digital signature 1040. The component supplier digital signature 1040 is created by the component supplier 802 by, for example, hashing the other component certificate fields 1010, 1020, etc., and signing the hash using a private cryptographic key of the component supplier 802 to generate the component supplier digital signature 1040.

In step 930, the original equipment manufacturer 804 physically installs or otherwise connects the component 400 to the vehicle 100 via the vehicle network 102, and provides the component certificate 806 to the vehicle 100 via download, flash memory or other means, which stores it in the secure vehicle memory 308 of the secure vehicle database 208. In step 940, the vehicle system 104 uses the component supplier digital signature 1040 to verify the component certificate 806 by, for example, using a root key of the component supplier that was previously stored in the secure vehicle memory 308 of the secure vehicle database 208. Alternatively, the vehicle system 104 could use a digital signature of a certificate authority certifying the component supplier 802 to verify a digital certificate from that certificate authority by, for example, using a root key of the certificate authority that was previously stored in the secure vehicle database 208.

In step 950, the vehicle system 104 issues a cryptographic challenge to the component 400, transferring challenge data such as a randomly generated number to the component 400 via the vehicle network 102. In step 960, the component 400 encrypts the challenge data using the component private key 604 and transfers the encrypted challenge data back to the vehicle system 104 via the vehicle network 102. In step 970, the vehicle system 104 confirms the authenticity of the component by decrypting the challenge data using the component public key 1020 from the component certificate 806 and determining that the challenge data decrypted by the component 400 is identical to the original challenge data before encryption by the vehicle system 104. Upon authenticating the component, the vehicle system 104 may authorize the component 400 to become operative within the vehicle, or to pass to a next required event or authorization.

The above process can be applied to authenticate a component any time during the life of a vehicle. This includes installation of the component during manufacture of the vehicle or subassembly of the vehicle, or after manufacture, such as by a dealer or OEM 804, or an after-market supplier. Component authentication can also be performed during testing, replacement, modification, upgrade or repair of the component, and periodically during operation of the vehicle. Additionally, component authentication can be performed during recycling of a component when a vehicle is decommissioned, removing the certificate and providing it to a new vehicle into which the component is installed.

Vehicle authentication of a component as described above provides many benefits. Even after manufacture and sale of the vehicle with respect to a component not predesignated for use with the vehicle, the vehicle manufacturer is able to accomplish configuration control through autonomous operation of the vehicle. Thus, the vehicle manufacturer is able to maintain brand control, allowing only components with a required brand. The vehicle manufacturer is also able to confirm that the component is not counterfeit. Thus, even after manufacture and sale of the vehicle, the vehicle manufacturer can ensure that an improper or inferior component is not installed which could damage the vehicle or reduce its capabilities and/or quality of performance. Further, protection against theft is provided, since the component is not operative without being authenticated using a second key such as a public key corresponding to the component private key 604.

Additional protection from theft of the component can be accomplished by another novel type of authentication provided herein, wherein vehicle authentication of a component is provided utilizing key separation. This is similar to vehicle authentication of a component as described above, but with the additional feature that the vehicle obtains the certification separately from the prospective component. That is, the component 400 and the component certificate 806 are provided by different physical means, a different physical path and/or at a different time. For example, the component 400 may be delivered to the original equipment manufacturer 804 by truck whereas the component certificate 806 is transferred to the original equipment manufacturer 804 via the internet. Separating the component 400 from the component certificate 806 protects against theft of the component 400, because the component 400 is not operable without being authenticated by a process utilizing the component public key in the certificate. Thus, in an embodiment of the invention utilizing key separation, step 920 would further include the component supplier 802 providing the component 400 and component certificate 806 separately to the original equipment manufacturer 804 and the original equipment manufacturer 804 matching the component 400 to the component certificate 806 by identifying the certificate with a component serial number that matches the component serial number 406 in the component 400.

Still another novel type of authentication provided herein is vehicle authentication of a component class. This type of authentication differs from component authentication as described above in that a component class of the prospective component, rather than the individual component, is authenticated. The prospective component is a member of a component class defined by similar attributes, such as being a same model or type, or having a same brand or supplier. All components in such a class utilize a same cryptographic key rather than having differing individual cryptographic keys.

In a general description of vehicle authentication of a component class, a vehicle obtains a prospective component for use in the vehicle. The prospective component has a first cryptographic key which is unique to the component class of the prospective component. The prospective component may be obtained directly from a component manufacture or component supplier, or indirectly through one or more other entities.

The vehicle also obtains from a certification authority a certification that an authentic component of the component class is associated with a second cryptographic key. An authentic component is a component whose identifying information and other attributes are true, including an identification of a component class of which the component is a member, as is vouched for by a certification authority that can be trusted as a reliable source. The certification authority could be a component supplier or manufacturer, or another certification authority such as a conventional public certification authority or specialized entity specific to the industry or a segment thereof. The certification authority could also itself be certified by a second certification authority, which could in turn be certified by a third certification authority, and so on.

The certification may be obtained directly or indirectly from the certification authority. The certification certifies that the second cryptographic key is bound to information identifying an authentic component of the component class, and may be implemented, for example, with a digital certificate obtained from a certificate authority. The certification may also include a digital signature of the certification authority. The certification may certify that a component having an identified attribute such as a component serial number, an identified component supplier or other attribute is associated with the second cryptographic key. The second cryptographic key may be a public cryptographic key and the first cryptographic key may be a private cryptographic key of the authentic component and potentially accessible only by the authentic component, corresponding to the public cryptographic key.

The vehicle utilizes the second cryptographic key obtained from the certification authority in cryptographic communication with the prospective component, and determines whether the prospective component is an authentic component of the component class based on whether the second cryptographic key is successfully utilized in the cryptographic communication. For example, the cryptographic key corresponds to a secret key of the authentic component class, such that successful decryption using the cryptographic key ensures that data could only be from a component in the authentic component class. Upon determining the prospective component is an authentic component of the component class, the vehicle may allow the prospective component to become operative within the vehicle.

The above process may be performed by the vehicle by, for example, a vehicle system having a cryptographic unit which utilizes the cryptographic key in cryptographic communication and a computing unit which determines whether the prospective component is an authentic component of the component class. The vehicle may additionally determine that the certification authority is authorized to certify the authentic component, such as by accessing a dynamic list that was prestored and remains rewritable by the vehicle manufacturer or applying a prestored root key to verify the digital signature of the certification authority.

Figure 11:
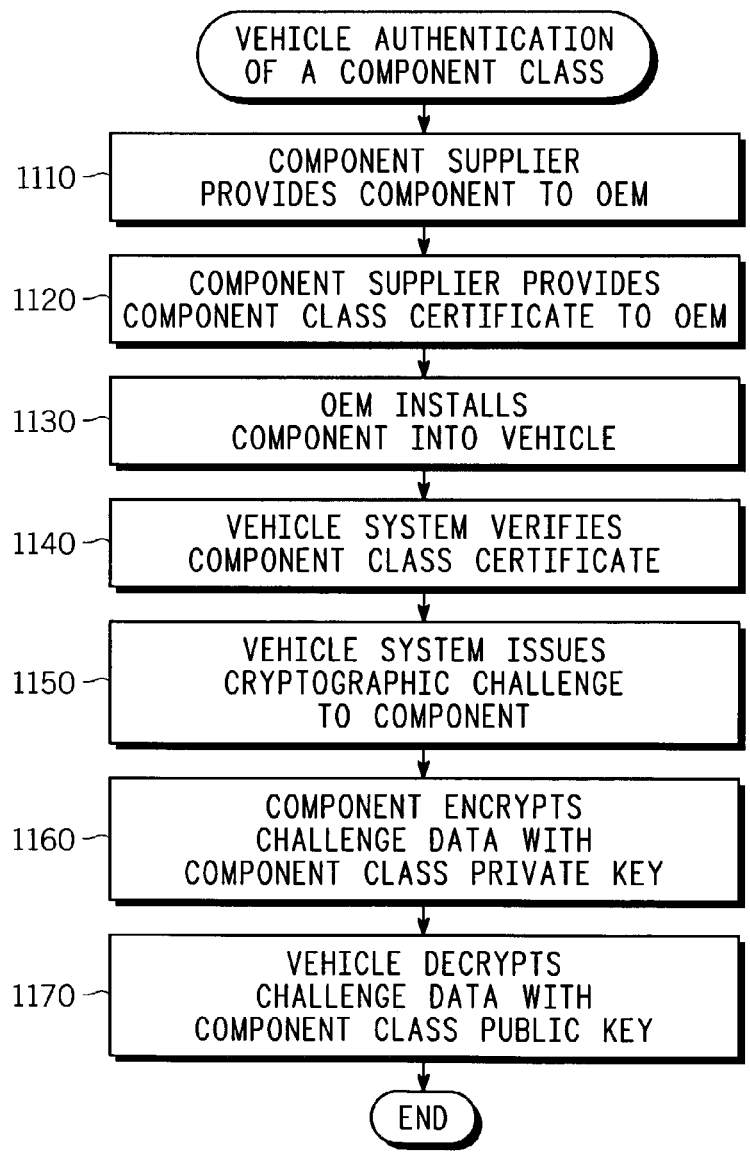
FIG. 11 is a flowchart of the process of vehicle authentication of a component class in accordance with an embodiment of the present invention.

As a more specific example, FIG. 11 illustrates a process for performing a potential embodiment of vehicle authentication of a component class. In step 1110, the component supplier 802 provides a component 400 to the original equipment manufacturer 804 as described before. In step 1120, the component supplier 802 provides a component class certificate 1200 to the original equipment manufacturer 804 which certifies the class of the component 400. The component class certificate 1200 is a digital certificate which is certified by the component supplier.

Figure 12:
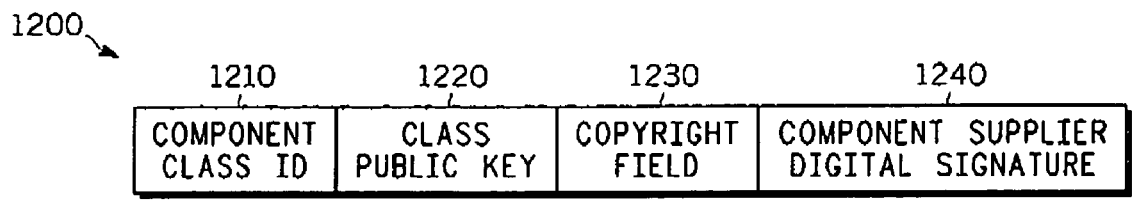
FIG. 12 is a block diagram illustrating a component class certificate in accordance with an embodiment of the present invention.

FIG. 12 shows a potential embodiment of the component class certificate 1200. The component class certificate 1200 includes a component class ID 1210 which matches the component serial number 406 or a corresponding class ID stored in the component 400. Preferably, the component class certificate 1200 also has a copyright field 1230 including a copyright notice, thus providing a degree of protection in that copying the certificate would potentially infringe the copyright. The component class certificate 1200 further includes a component class public key 1220 which corresponds to the component private key 604 in the component cryptographic unit 404 of the component 400. The component class certificate 1200 also includes, potentially in addition to other component class certificate fields, a component supplier digital signature. The component supplier digital signature 1240 is generated, for example, in a fashion similar to the component supplier digital signature 1040 as described above.

In step 1130, the original equipment manufacturer 804 physically installs or otherwise connects the component 400 to the vehicle 100 via the vehicle network 102, and provides the component class certificate 1200 to the vehicle 100, which stores it in the secure vehicle memory 308 of the secure vehicle database 208. In step 1140, the vehicle system 104 uses the component supplier digital signature 1240 to verify the component class certificate 1200 by, for example, using a root key of the component supplier that was previously stored in the secure vehicle memory 308 of the secure vehicle database 208. Alternatively, the vehicle system 104 could use a digital signature of a certificate authority certifying the component supplier 802 to verify a digital certificate from that certificate authority by, for example, using a root key of the certificate authority that was previously stored in the secure vehicle database 208.

In step 1150, the vehicle system 104 issues a cryptographic challenge to the component 400, transferring a randomly generated number to the component 400 via the vehicle network 102. In step 1160, the component 400 encrypts the challenge data using the component private key 604 and transfers the encrypted challenge data back to the vehicle system 104 via the vehicle network 102. In step 1170, the vehicle system 104 uses the component class public key from the component class certificate 1200 to decrypt the challenge data, confirming the authenticity of the component class by determining that the decrypted challenge data is identical to the original challenge data before encryption by the component 400. Upon authenticating the component class, the vehicle system 104 may authorize the component 400 to become operative within the vehicle, or to pass to a next required event or authorization.

Vehicle authentication of a component class offers the advantage of reduced cost and improved efficiency in providing security for a component in that a different key pair does not have to be generated for every component. Even so, the vehicle is still able to authenticate that the component belongs to a particular class and thus ensure that it is appropriate for the use for which it is being installed. Further, assuming the private key is not previously compromised, the vehicle is also able to confirm that the component is from the component supplier and not counterfeit, thus maintaining brand control.

Yet another novel type of authentication provided herein is multiple scope authentication of vehicle components. In this type of authentication, a vehicle may authenticate one component individually, but authenticate a component class of a different component. This is beneficial because, for example, the expense, criticality and sensitivity of different components may warrant different degrees of investment by manufacturers, OEMs and customers to obtain correspondingly different degrees of security. Providing the option within a same vehicle to authenticate either a component or a component class provides greater value to the vehicle by allowing vehicle and component manufacturers to choose to invest in a level of security that is warranted by the value of a given component and by its particular need for authenticity.

Generally speaking, multiple scope authentication of vehicle components thus combines the concepts of component authentication and component class authentication as described above, wherein a first prospective component has a cryptographic key unique to the first prospective component, and a second prospective component has a cryptographic key that is unique to a component class of the second prospective component. The first prospective component is authenticated as described above for vehicle authentication of a component, and the second prospective component is authenticated as described above for vehicle authentication of a component class.

More specifically, a potential embodiment of multiple scope authentication of vehicle components may be realized by a same vehicle performing the process of FIG. 9 with respect to a first component, wherein a cryptographic key, such as a component private key 604 for the first component, is unique to the first component, and by performing the process of FIG. 11 with respect to a second component, wherein a different cryptographic key, such as of different component private key 604 for the second component, is only unique to an entire component class of the second component.

Other novel types of authentication provided herein involve authentication performed by a subassembly of a vehicle or a component for use with the vehicle. One such type of authentication is component authentication of a vehicle, which can be generally described as follows. A component for use in a prospective vehicle accesses the vehicle, such as by physical installation or connection to the vehicle. The component obtains from a certification authority a certification that an authentic vehicle is associated with a cryptographic key. An authentic vehicle is a vehicle whose identifying information and other attributes are true, as is vouched for by a certification authority that can be trusted as a reliable source. The certification authority could be a vehicle supplier or manufacturer, or another certification authority such as a conventional public certification authority or specialized entity specific to the industry or a segment thereof. The certification authority could also itself be certified by a second certification authority, which could in turn be certified by a third certification authority, and so on.

The certification may be obtained directly or indirectly from the certification authority. The certification certifies that the cryptographic key is bound to information identifying the authentic vehicle, and may be implemented, for example, with a digital certificate obtained from a certificate authority. The certification may also include a digital signature of the certification authority. The certification may certify that a vehicle having an identified attribute such as a vehicle identifier, an identified vehicle manufacturer or other attribute is associated with the cryptographic key.

The cryptographic key may be a public cryptographic key of the authentic vehicle and the authentic vehicle may have a corresponding private cryptographic key potentially accessible only by the authentic vehicle. The component utilizes the cryptographic key obtained from the certification authority in cryptographic communication with the prospective vehicle, and determines whether the prospective vehicle is the authentic vehicle based on whether the cryptographic key is successfully utilized in the cryptographic communication. For example, the cryptographic key corresponds to a secret key of the authentic vehicle, such that successful decryption using the cryptographic key ensures that data could only be from the authentic vehicle. Upon determining the prospective vehicle is the authentic vehicle, the component may allow the prospective vehicle to operate the component.

The above process may be performed by the component by, for example, a cryptographic unit which utilizes the cryptographic key in cryptographic communication and a computing unit which determines whether the prospective vehicle is the authentic vehicle.

Figure 13:
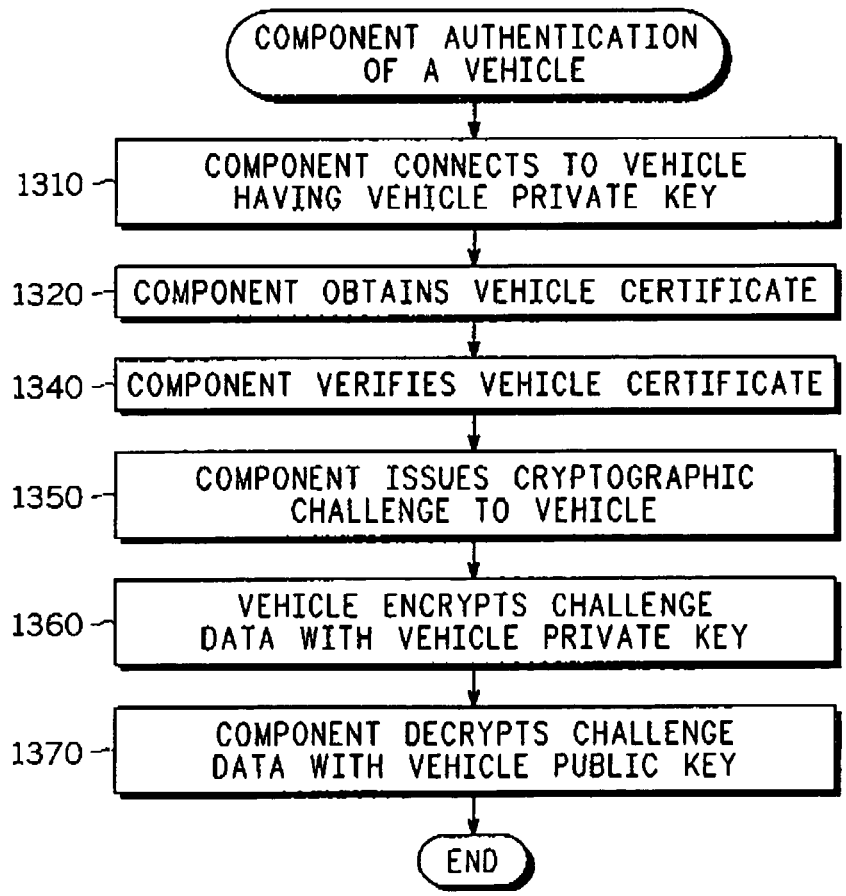
FIG. 13 is a flowchart of the process of component authentication of a vehicle in accordance with an embodiment of the present invention.

As a more specific example, FIG. 13 illustrates a process for performing a potential embodiment of component authentication of a vehicle. In step 1310, the component 400 connects to the vehicle 100 such as by installation for potential use in the vehicle 100. The vehicle 100 has a vehicle private key 504 which is, for example, stored in the secure vehicle database 208 shown in FIG. 3. In step 1320, the component 400 obtains a vehicle certificate 306 which certifies the vehicle 100 and is, for example, a digital certificate also stored in the secure vehicle database 208. FIG. 14 shows a potential embodiment of the vehicle certificate 306. The vehicle certificate 306 includes a vehicle identifier 1410 which matches the vehicle identifier 302 for the vehicle 100 it certifies. The vehicle certificate 306 further includes a vehicle public key 1420 which corresponds to the vehicle private key 504 of the vehicle 100 it certifies.

The vehicle certificate 306 also includes, potentially in addition to other vehicle certificate fields, a vehicle manufacturer digital signature 1440 of a vehicle manufacture, or a digital signature of some other certificate authority certifying the vehicle. The vehicle manufacturer digital signature 1440 is generated, for example, in a fashion similar to the component supplier digital signature 1040 as described above. In step 1340, the component 400 verifies the vehicle certificate 306 using the certificate authority digital signature from the vehicle certificate 306 as a verification by, for example, using a root key of the certificate authority that was previously stored in the component 400 or is otherwise obtained.

In step 1350, the component 400 issues a cryptographic challenge to the vehicle system 104, transferring a randomly generated number to the vehicle system 104 via the vehicle network 102. In step 1360, the vehicle system 104 encrypts the challenge data using the vehicle private key 504 and transfers the encrypted challenge data back to the component 400 via the vehicle network 102. In step 1370, the component 400 uses the vehicle public key from the vehicle certificate 306 to decrypt the challenge data, confirming the authenticity of the vehicle 100 by determining that the challenge data decrypted by the component 400 is identical to the original challenge data before encryption by the component 400. Upon authenticating the vehicle, the component 400 may authorize the vehicle 100 to operate the component 400, or to pass to a next required event or authorization. By performing the above process to authenticate a vehicle, the component confirms the authenticity of the vehicle, providing advantages such as brand control for component suppliers and OEMs.

An additional novel type of authentication performed by a component for use in a vehicle involves vehicle component authentication of another vehicle component. As a general description of this type of authentication, a configured component of a vehicle obtains from a certification authority a certification that an authentic component is associated with a cryptographic key. An authentic component is a component whose identifying information and other attributes are true, as is vouched for by a certification authority that can be trusted as a reliable source. The certification authority could be a component supplier or manufacturer, or another certification authority such as a conventional public certification authority or specialized entity specific to the industry or a segment thereof. The certification authority could also itself be certified by a second certification authority, which could in turn be certified by a third certification authority, and so on.

The certification may be obtained directly or indirectly from the certification authority. The certification certifies that the cryptographic key is bound to information identifying the authentic component, and may be implemented, for example, with a digital certificate obtained from a certificate authority. The certification may also include a digital signature of the certification authority. The certification may certify that a component having an identified attribute such as a component serial number, an identified component manufacturer or other attribute is associated with the cryptographic key.

The cryptographic key may be a public cryptographic key of the authentic component and the prospective component may have a corresponding private cryptographic key of the authentic component and potentially accessible only by the authentic component.

The configured component utilizes the cryptographic key obtained from the certification authority in cryptographic communication with the prospective component, and determines whether the prospective component is the authentic component based on whether the cryptographic key is successfully utilized in the cryptographic communication. For example, the cryptographic key corresponds to a secret key of the authentic component, such that successful decryption using the cryptographic key ensures that data could only be from the authentic component. Upon determining the prospective component is the authentic component, the configured component may allow the prospective vehicle to operate the component.

The above process may be performed by the configured component by, for example, a cryptographic unit which utilizes the cryptographic key in cryptographic communication and a computing unit which determines whether the prospective vehicle is the authentic vehicle.

As a more specific example, FIG. 15 illustrates a process for performing a potential embodiment of vehicle component authentication of another vehicle component. In step 1510, a prospective component for use in the vehicle 100 is accessed by a second component already part of the configuration of the vehicle 100. Both the prospective and second component are implemented, for example, as component 400 is described in FIG. 4. The prospective component has a component private key 604 which is, for example, as shown in FIG. 4. In step 1520, the second component obtains a component certificate 806 which certifies the prospective component. A potential embodiment of the component certificate 806 was shown in FIG. 10. In step 1540, the second component verifies the component certificate 806 of the prospective component using the component supplier digital signature from the component certificate 806 as a verification by, for example, using a root key of the component supplier.

In step 1550, the second component issues a cryptographic challenge to the prospective component, transferring challenge data such as a randomly generated number to the prospective component via the vehicle network 102. In step 1560, the prospective component encrypts the challenge data using the component private key 604 and transfers the encrypted challenge data back to the second component via the vehicle network 102. In step 1570, the second component using the component public key from the component certificate 806 of the prospective component to decrypt the challenge data, confirming the authenticity of the prospective component by determining that the challenge data decrypted by the second component is identical to the original challenge data before encryption by the second component. Upon authenticating the prospective component, the second component may authorize operation of the prospective component with the configured component and/or within the vehicle, or to pass to a next required event or authorization.

Other novel types of authentication provided herein involve authentication of or by a vehicle subassembly. A vehicle subassembly is a group of configuration elements which are combined as a unit within a vehicle during or after production of the vehicle or a portion thereof. For example, a group of components 106 may be combined together as a subassembly which can then be treated similarly to a component 106 and combined with other components 106 or other subassemblies. In this fashion, there can also be nested layers of subassemblies which include subordinate subassemblies and potentially other components, and so on.

One novel type of authentication involving a vehicle subassembly is vehicle subassembly authentication of a component within the subassembly. As a general description of this type of authentication, a vehicle subassembly obtains a prospective component for use in the vehicle subassembly. The prospective component may be obtained directly from a component manufacturer or component supplier, or indirectly through one or more other entities. The vehicle subassembly also obtains from a certification authority a certification that an authentic component is associated with a cryptographic key. An authentic component is a component whose identifying information and other attributes are true, as is vouched for by a certification authority that can be trusted as a reliable source.

The certification authority could be a component supplier or manufacturer, or another certification authority such as a conventional public certification authority or specialized entity specific to the industry or a segment thereof. The certification authority could also itself be certified by a second certification authority, which could in turn be certified by a third certification authority, and so on.

The certification may be obtained directly or indirectly from the certification authority. The certification certifies that the cryptographic key is bound to information identifying the authentic component, and may be implemented, for example, with a digital certificate obtained from a certificate authority. The certification may also include a digital signature of the certification authority. The certification may certify that a component having an identified attribute such as a component serial number, an identified component supplier or other attribute is associated with the cryptographic key. The cryptographic key may be a public cryptographic key corresponding to a private key of the authentic component, which could be accessible only by the authentic component.

The vehicle subassembly utilizes the cryptographic key obtained from the certification authority in cryptographic communication with the prospective component, and determines whether the prospective component is the authentic component based on whether the cryptographic key is successfully utilized in the cryptographic communication. For example, the cryptographic key corresponds to a secret key of the authentic component, such that successful decryption using the cryptographic key ensures that data could only be from the authentic component. Upon determining the prospective component is the authentic component, the vehicle subassembly may allow the prospective component to become operative within the vehicle subassembly.

The above process may be performed by the vehicle subassembly by, for example, a subassembly system having a cryptographic unit which utilizes the cryptographic key in cryptographic communication and a computing unit which determines whether the prospective component is the authentic component. The vehicle subassembly may additionally determine that the certification authority is authorized to certify the authentic component, such as by accessing a dynamic list that was prestored and remains rewritable by the vehicle subassembly manufacturer or applying a prestored root key to verify the digital signature of the certification authority. Additionally, the vehicle subassembly may itself be authenticated by a vehicle system of the vehicle, a component of the vehicle, or a configured subassembly of the vehicle.

More specifically, in a potential embodiment of vehicle subassembly authentication of a component as described above, a vehicle subassembly contains a number of components 106 and is implemented as a potential configuration element of the vehicle 100. The process can be implemented by the subassembly system performing the steps that were described in FIG. 9 as being performed by the vehicle system 104. A subassembly system performing the above process could be implemented in the form of a component 400 and potentially with additional functions and capabilities similar to those of the vehicle system 104. The subassembly system could be implemented as a single configuration element or distributed throughout the vehicle subassembly or vehicle network 102.

Vehicle subassembly authentication of a component may be performed a number of times to authenticate a number of components, such as authenticating all components in the vehicle subassembly to ensure the vehicles subassembly is an authentic entity. This provides efficiency advantages, as the vehicle subassembly can then itself be authenticated once as a singular entity by a vehicle, component or configured subassembly.

Another novel type of authentication involving a vehicle subassembly is vehicle authentication of a subassembly within the vehicle. As a general description, a vehicle obtains a prospective subassembly for use in the vehicle. The prospective subassembly may be obtained directly from a subassembly manufacturer or subassembly supplier, or indirectly through one or more other entities. The vehicle also obtains from a certification authority a certification that an authentic subassembly is associated with a cryptographic key. An authentic subassembly is a subassembly whose identifying information and other attributes are true, as is vouched for by a certification authority that can be trusted as a reliable source.

The certification authority could be a subassembly supplier or manufacturer, or another certification authority such as a conventional public certification authority or specialized entity specific to the industry or a segment thereof. The certification authority could also itself be certified by a second certification authority, which could in turn be certified by a third certification authority, and so on.

The certification may be obtained directly or indirectly from the certification authority. The certification certifies that the cryptographic key is bound to information identifying the authentic subassembly, and may be implemented, for example, with a digital certificate obtained from a certificate authority. The certification may also include a digital signature of the certification authority. The certification may certify that a subassembly having an identified attribute such as a subassembly serial number, an identified subassembly supplier or other attribute is associated with the cryptographic key. The cryptographic key may be a public cryptographic key corresponding to a private key of the authentic subassembly, which could be accessible only by the authentic subassembly.

The vehicle utilizes the cryptographic key obtained from the certification authority in cryptographic communication with the prospective subassembly, and determines whether the prospective subassembly is the authentic subassembly based on whether the cryptographic key is successfully utilized in the cryptographic communication. For example, the cryptographic key corresponds to a secret key of the authentic subassembly, such that successful decryption using the cryptographic key ensures that data could only be from the authentic subassembly. Upon determining the prospective subassembly is the authentic subassembly, the vehicle may allow the prospective subassembly to become operative within the vehicle.

The above process may be performed by the vehicle by a configuration element of the vehicle 100 which has a cryptographic unit which utilizes the cryptographic key in cryptographic communication and a computing unit which determines whether the prospective subassembly is the authentic subassembly. The configuration element may be, for example, the vehicle system 104, a component 106 or a configured subassembly of components. The vehicle may additionally determine that the certification authority is authorized to certify the authentic subassembly, such as by accessing a dynamic list that was prestored and remains rewritable by the vehicle manufacturer or applying a prestored root key to verify the digital signature of the certification authority.

More specifically, in a potential embodiment of vehicle authentication of a subassembly as described above, the process described above can be implemented by the vehicle by performing the steps performed in FIG. 9 with respect to the subassembly instead of a single component, and applied to a subassembly system representing the prospective subassembly instead of a prospective component. The subassembly system performing the above process could be implemented in the form of a component 400, storing a private cryptographic key of the prospective subassembly and other such information similar to that stored by a component 400. The subassembly system could be implemented as a single configuration element or distributed throughout the vehicle subassembly or vehicle network 102.

Still other novel types of authentication provided herein involve the authentication of vehicles or components external to the vehicle for secure communication therewith. One such type of authentication involves secure vehicle communication with a remote access device. As a general description of this concept, a vehicle obtains from a certification authority a certification that an authentic device is associated with a cryptographic key. An authentic device is a device whose identifying information and other attributes are true, as is vouched for by a certification authority that can be trusted as a reliable source.

The certification authority could be a supplier or manufacturer of the authentic device, or another certification authority such as a conventional public certification authority or specialized entity specific to the industry or a segment thereof. The certification authority could also itself be certified by a second certification authority, which could in turn be certified by a third certification authority, and so on.

The certification may be obtained directly or indirectly from the certification authority. The certification certifies that the cryptographic key is bound to information identifying the authentic device, and may be implemented, for example, with a digital certificate obtained from a certificate authority. The certification may also include a digital signature of the certification authority. The certification may certify that a component having an identified attribute associated with the cryptographic key. The cryptographic key may be a public cryptographic key of the authentic device corresponding to a private cryptographic key of the authentic device potentially accessible only by the authentic device.

The vehicle utilizes the cryptographic key obtained from the certification authority in cryptographic communication with the remote access device, and determines whether the remote access device is the authentic device based on whether the cryptographic key is successfully utilized in the cryptographic communication. For example, the cryptographic key corresponds to a secret key of the authentic device, such that successful decryption using the cryptographic key ensures that data could only be from the authentic device. Upon determining the remote access device is the authentic device, the vehicle communicates further with the remote access device.

The above process may be performed by the vehicle by, for example, a vehicle system having a cryptographic unit which utilizes the cryptographic key in cryptographic communication and a computing unit which determines whether the prospective component is the authentic component. The vehicle may additionally determine that the certification authority is authorized to certify the authentic device, such as by accessing a dynamic list that was prestored and remains rewritable by the vehicle manufacturer or applying a prestored root key to verify the digital signature of the certification authority.

The remote access device may be connected to a secure device which performs the cryptographic functions in the cryptographic communication described above and stores a cryptographic key such as the private cryptographic key, which may be accessible only by the secure device. Alternatively, the remote access may perform the cryptographic functions and/or store the private cryptographic key, and may require a password or biometric authentication from a user in order to use the remote access device to access the vehicle.

Figure 16:
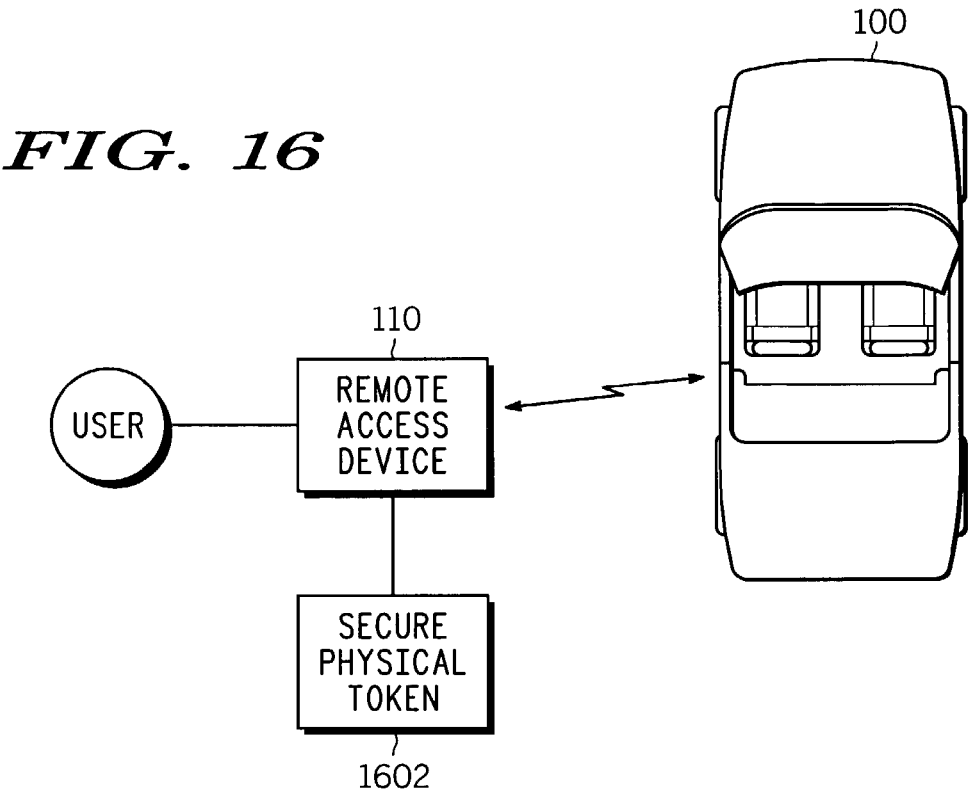
FIGS. 16–17 are block diagrams illustrating an environment in which a remote access device is authenticated for secure communication in accordance with an embodiment of the present invention.
Figure 17:
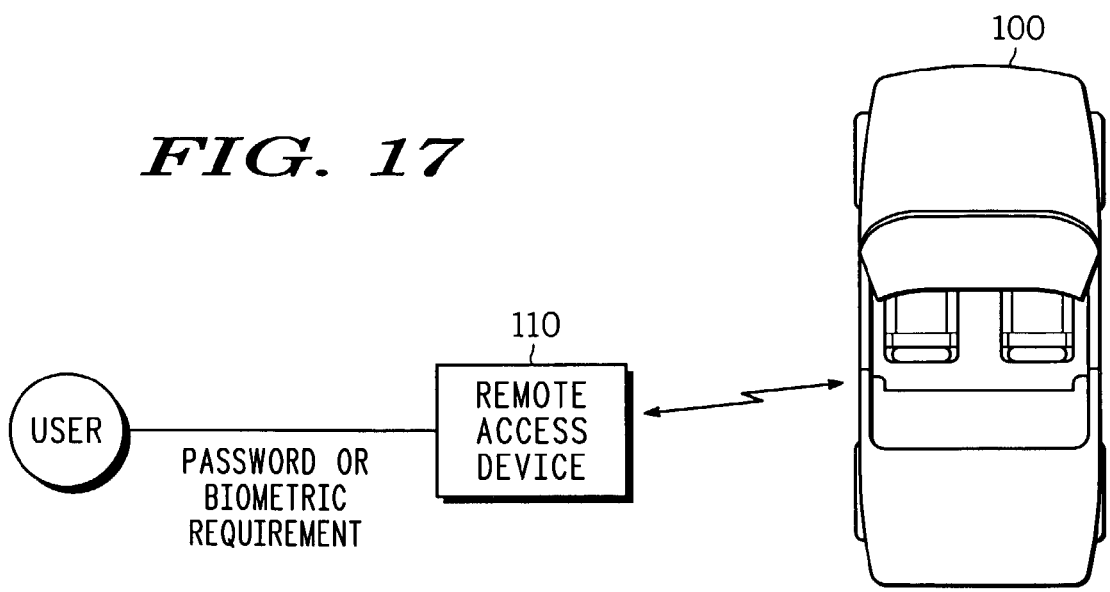

More specifically, a potential embodiment of secure vehicle communication with a remote access device is described with reference to FIGS. 16–18. FIGS. 16 and 17 illustrate alternative implementations of this potential embodiment. In FIG. 16, a remote access device 110 is communicatively coupled to a vehicle 100 via a wireless communication link. The remote access device 110 is also connected to a secure physical token 1602 which represents the remote access device 110 in secure communication with the vehicle 100. FIG. 17 illustrates an alternative implementation in which the remote access device 110 is not represented by a secure physical token 120, but rather requires the user to enter a password or obtains other identifying data such as biometric data. The secure physical token 1602 in FIG. 16, and a corresponding portion of the remote access device 110 in FIG. 17, can be considered a type of component and, as such, include in some form a computing element, cryptographic algorithms in addition to other elements such as are discussed below.

Figure 18:
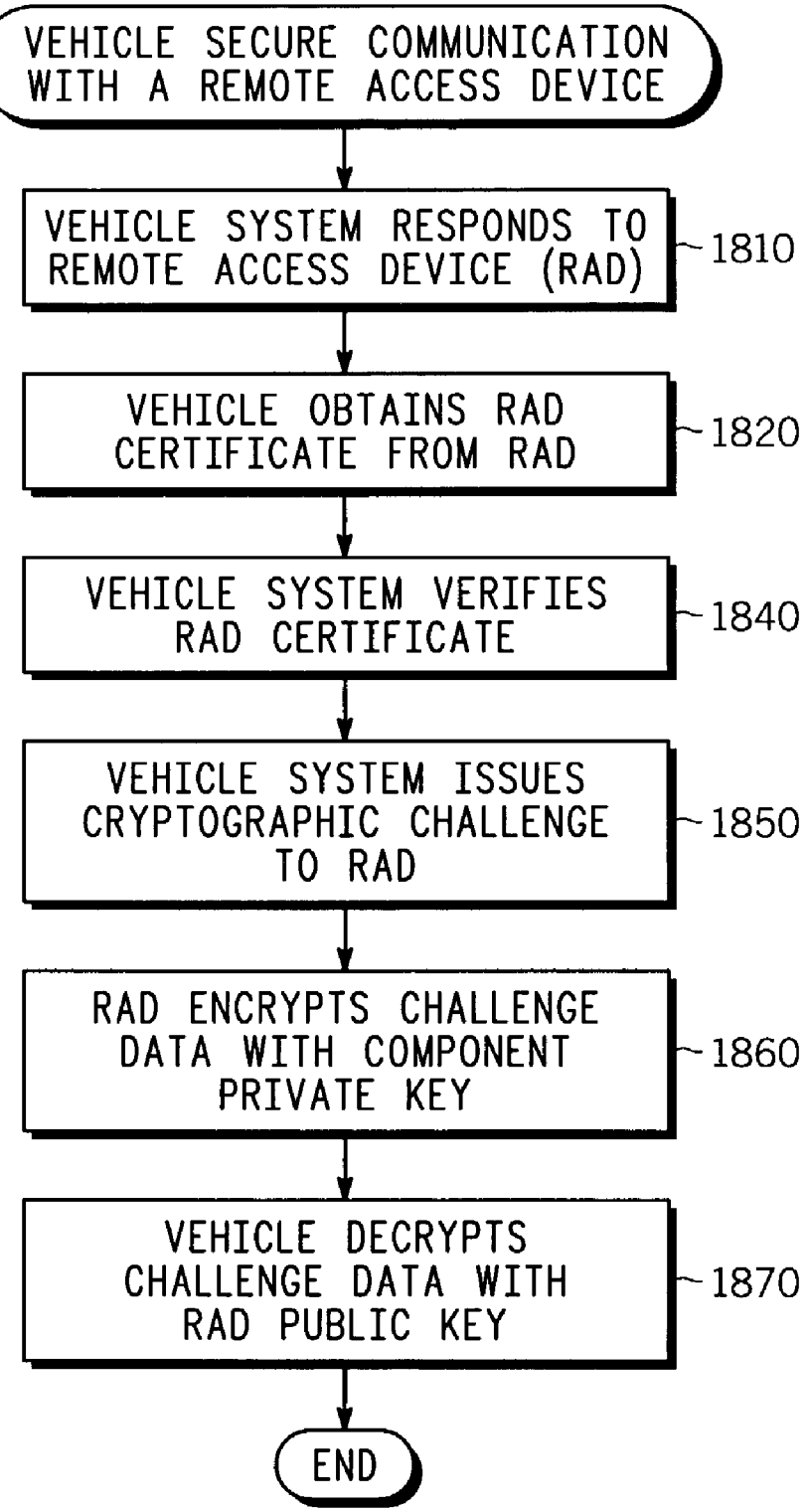
FIG. 18 is a flowchart of the process of vehicle secure communication with a remote access device in accordance with an embodiment of the present invention.

FIG. 18 illustrates a process of a potential embodiment of secure vehicle communication with a remote access device corresponding to the implementations described above with reference to FIGS. 16 and 17. In step 1810, the vehicle system 104 responds to the remote access device 110, either in response to a request for access by the remote access device 110 or in response to the remote access device 110 coming within range or a predetermined distance of the vehicle 100. In step 1820, the vehicle system 104 obtains an remote access device certificate 1900 from a certificate authority. The remote access device certificate 1900 is, for example, a digital certificate which is certified by the certificate authority.

FIG. 19 shows a potential embodiment of the remote access device certificate 1900. The remote access device certificate 1900 includes a remote access device identification (ID) number 1910 that matches an ID number stored in the remote access device 110 or in the secure physical token 1602 representing the remote access device 110. The remote access device certificate 1900 further includes a remote access device public key 1920 which corresponds to a private key of the remote access device 110 stored in the secure physical token 1602. The remote access device certificate 1900 also includes, potentially in addition to other remote access device certificate fields, a certificate authority digital signature 1940 of the certificate authority providing the remote access device certificate 1900. The remote access device certificate 1900 is generated, for example, in a fashion similar to the component supplier digital signature 1040 as described above. In step 1840, the vehicle system 104 verifies the remote access device certificate 1900 using the certificate authority digital signature from the remote access device certificate 1900 as a verification by, for example, using a root key of the certificate authority that was previously stored in the secure vehicle database 208.

In step 1850, the vehicle system 104 issues a cryptographic challenge to the remote access device certificate 1900, the vehicle 100 transmitting challenge data such as a randomly generated number to the remote access device 110. In step 1860, the remote access device 110 or the secure physical token 1602 representing the remote access device 110 encrypts the challenge data using the private key of the remote access device 110 and transmits the encrypted challenge data back to the vehicle 100. In step 1870, the vehicle system 104 confirms the authenticity of the remote access device 110 by decrypting the challenge data using the public key of the remote access device 110 from the remote access device certificate 1900 and determining that the challenge data decrypted by the vehicle system 104 is identical to the original challenge data before encryption by the vehicle system 104. Upon authenticating the remote access device 110, the vehicle system 104 may authorize the remote access device 110 to access vehicle data in the vehicle 100.

Another novel type of authentication of elements external to the vehicle relates to secure vehicle communication with another vehicle, which can be generally described as follows. A first vehicle obtains from a certification authority a certification that an authentic vehicle is associated with a cryptographic key. An authentic vehicle is a vehicle whose identifying information and other attributes are true, as is vouched for by a certification authority that can be trusted as a reliable source.

The certification authority could be a supplier or manufacturer of the authentic vehicle, or another certification authority such as a conventional public certification authority or specialized entity specific to the industry or a segment thereof. The certification authority could also itself be certified by a second certification authority, which could in turn be certified by a third certification authority, and so on.

The certification may be obtained directly or indirectly from the certification authority. The certification certifies that the cryptographic key is bound to information identifying the authentic vehicle, and may be implemented, for example, with a digital certificate obtained from a certificate authority. The certification may also include a digital signature of the certification authority. The certification may certify that a vehicle having an identified attribute associated with the cryptographic key. The cryptographic key may be a public cryptographic key of the authentic vehicle corresponding to a private cryptographic key of the authentic vehicle potentially accessible only by the authentic vehicle.

The first vehicle utilizes the cryptographic key obtained from the certification authority in cryptographic communication with a second vehicle, and determines whether the second vehicle is the authentic vehicle based on whether the cryptographic key is successfully utilized in the cryptographic communication. For example, the cryptographic key corresponds to a secret key of the authentic vehicle, such that successful decryption using the cryptographic key ensures that data could only be from the authentic vehicle. Upon determining the second vehicle is the authentic vehicle, the vehicle communicates further with the second vehicle.

The above process may be performed by the first vehicle by, for example, a vehicle system having a cryptographic unit which utilizes the cryptographic key in cryptographic communication and a computing unit which determines whether the prospective component is the authentic component. The first vehicle may additionally determine that the certification authority is authorized to certify the authentic device, such as by accessing a dynamic list that was prestored and remains rewritable by the vehicle manufacturer or applying a prestored root key to verify the digital signature of the certification authority.

As a more specific example, FIG. 20 illustrates a process of a potential embodiment of secure vehicle communication with another vehicle. In step 2010, a first vehicle 100 accesses a second vehicle 130. The second vehicle 130 has a vehicle private key 504 which is, for example, stored in the secure vehicle database 208 shown in FIG. 3. In step 2020, the first vehicle 100 obtains a vehicle certificate 306 which certifies the second vehicle 130 and is, for example, a digital certificate also stored in the secure vehicle database 208. It will be remembered that FIG. 14 shows a potential embodiment of the vehicle certificate 306. The vehicle certificate 306 includes a vehicle identification number which matches the vehicle identifier 302 for the second vehicle 130. The vehicle certificate 306 further includes a vehicle public key which corresponds to the vehicle private key 504 of the second vehicle 130. The vehicle certificate 306 additionally includes a vehicle manufacturer digital signature which uniquely identifies the vehicle manufacture, or a certificate authority digital signature which uniquely identifies another certificate authority certifying the second vehicle 130. In step 2040, the first vehicle 100 verifies the vehicle certificate 306 using the certificate authority digital signature from the vehicle certificate 306 as a verification by, for example, using a root key of the certificate authority that was previously stored in the secure vehicle database 208 of the first vehicle 100.

In step 2050, the first vehicle 100 issues a cryptographic challenge to the second vehicle 130, transmitting a randomly generated number to the second vehicle 130. In step 2060, the vehicle system 104 of the second vehicle 130 encrypts the challenge data using the vehicle private key 504 and transmits the encrypted challenge data back to the first vehicle 100. In step 2070, the first vehicle uses the vehicle public key from the vehicle certificate 306 of the second vehicle 130 to decrypt the challenge data, confirming the authenticity of the second vehicle 130 by determining that the challenge data decrypted by the first vehicle 100 is identical to the original challenge data before encryption by the first vehicle 100. Upon authenticating the second vehicle 130, the first vehicle 100 may authorize the second vehicle 130 to access vehicle data within the first vehicle 100.

Still another novel type of authentication provided herein involves vehicle authentication of a service technician. As a general description of this type of authentication, a vehicle accesses a secure device having limited accessibility but being accessible by a service technician. The service technician can be anyone desiring to perform a service operation on the vehicle such as installation, upgrade or repair of a configuration element of the vehicle. The secure device stores a first cryptographic key associated with the service technician. The vehicle also obtains from a certification authority a certification that an authentic technician is associated with a second cryptographic key corresponding to the first cryptographic key. An authentic technician is a technician whose identifying information and other attributes are true, as is vouched for by a certification authority that can be trusted as a reliable source.

The certification authority could be a manufacturer or supplier of the vehicle or a component related to the service operation, or another certification authority such as a conventional public certification authority or specialized entity specific to the industry or a segment thereof. The certification authority could also be a second service technician and/or could itself be certified by a second certification authority, which could in turn be certified by a third certification authority, and so on.

The certification may be obtained directly or indirectly from the certification authority. The certification certifies that the second cryptographic key is bound to information identifying the authentic technician, and may be implemented, for example, with a digital certificate obtained from a certificate authority. The certification may also include a digital signature of the certification authority. The certification may certify an attribute as well as the identity of the service technician. The certification may certify that the service technician is considered reliable and/or a member of an authorized organization. And, given that such factors change frequently, the certification may be time-limited, such as a digital certificate with an expiration date and time. The second cryptographic key may be a public cryptographic key corresponding to a private key of the authentic technician and potentially accessible only by the authentic technician.

The vehicle utilizes the second cryptographic key obtained from the certification authority in cryptographic communication with the secure device, and determines whether the service technician is the authentic technician based on whether the cryptographic key is successfully utilized in the cryptographic communication. For example, the cryptographic key corresponds to a secret key of the authentic technician, such that successful decryption using the cryptographic key ensures that data could only be from the authentic technician. Upon determining the service technician is the authentic technician, the vehicle may allow the prospective component to become operative within the vehicle.

The above process may be performed by the vehicle by, for example, a vehicle system having a cryptographic unit which utilizes the cryptographic key in cryptographic communication and a computing unit which determines whether the service technician is the authentic technician. The vehicle may additionally determine that the certification authority is authorized to certify the authentic technician, such as by accessing a dynamic list that was prestored and remains rewritable by the vehicle manufacturer or applying a prestored root key to verify the digital signature of the certification authority.

Figure 21:
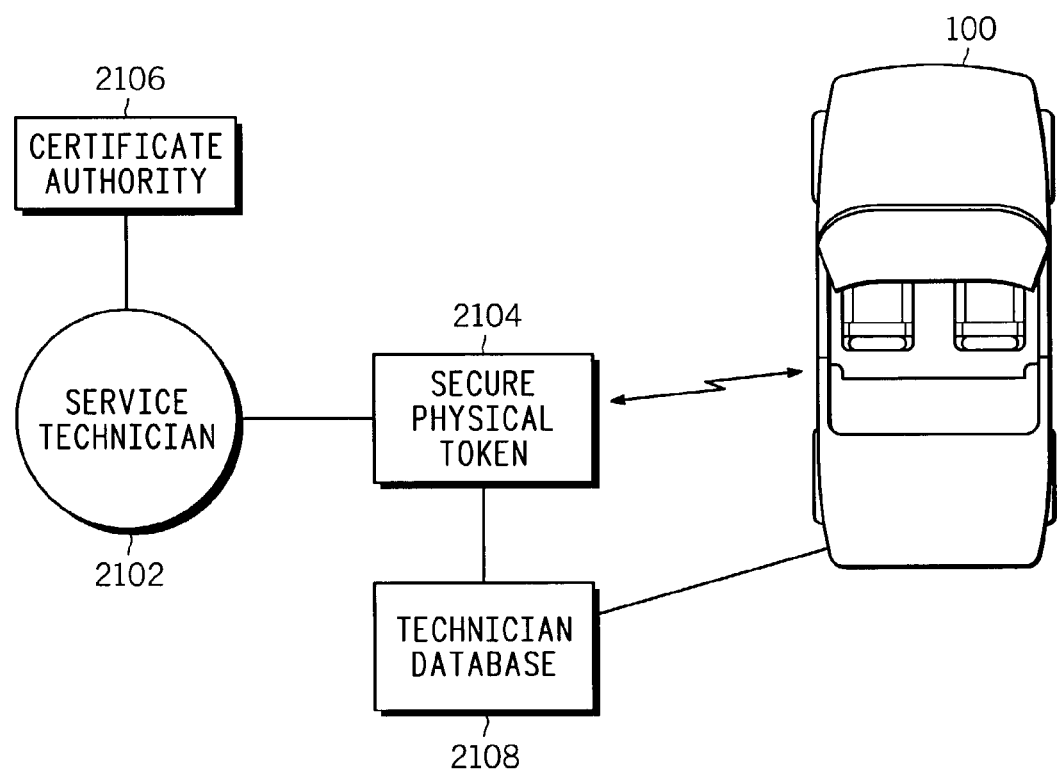
FIG. 21 is a block diagram illustrating an environment in which a service technician is authenticated in accordance with an embodiment of the present invention.
Figure 22:
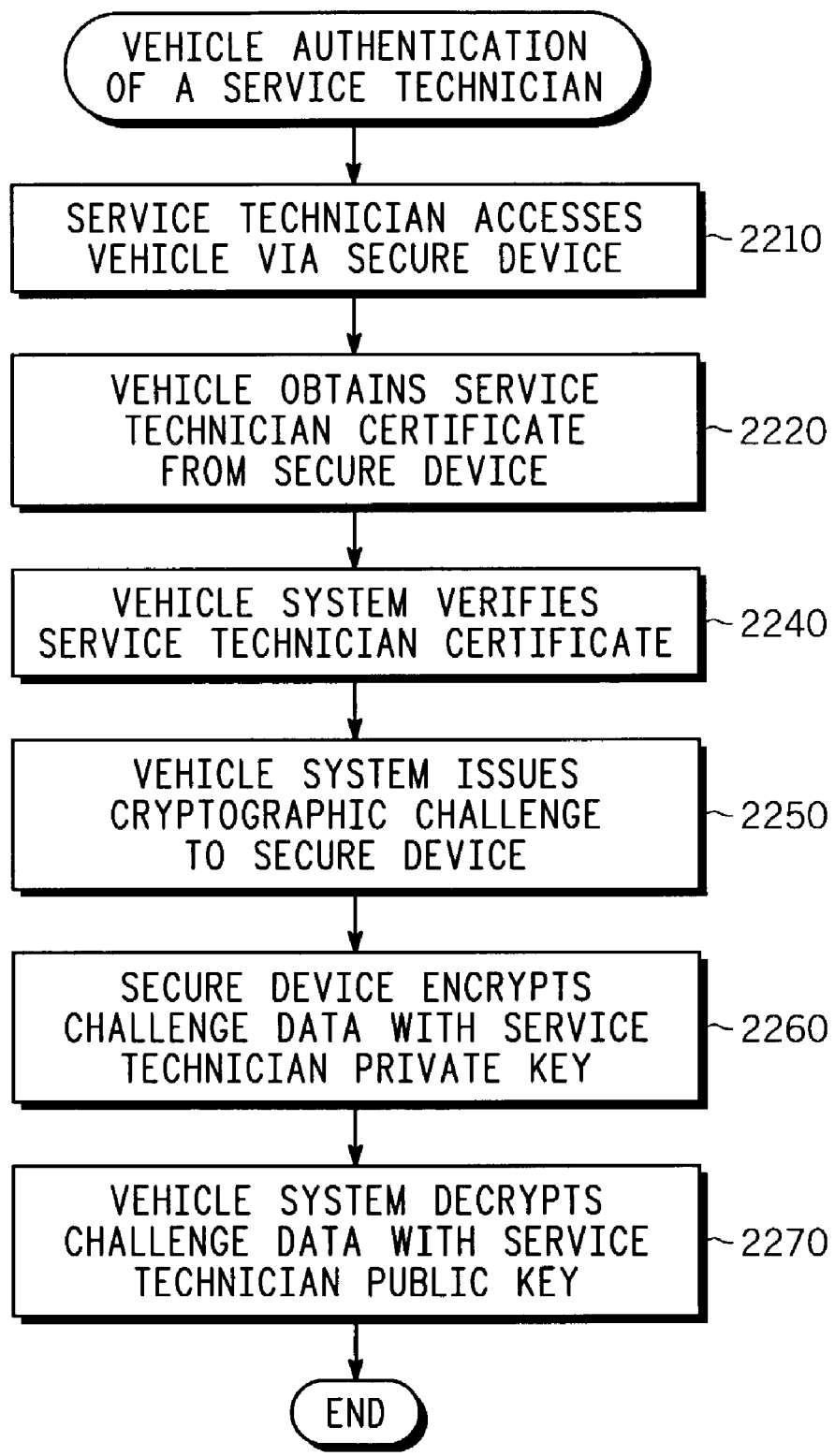
FIG. 22 is a flowchart of the process of vehicle authentication of a service technician in accordance with an embodiment of the present invention.
Figure 23:
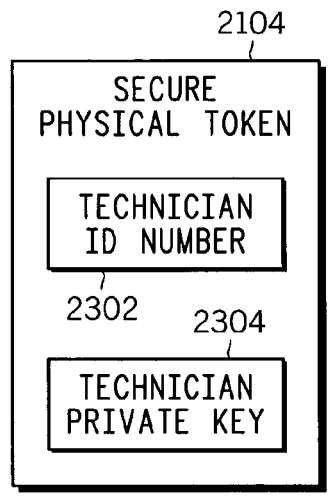
FIG. 23 is a block diagram illustrating a secure physical token for a service technician in accordance with an embodiment of the present invention.
Figure 24:
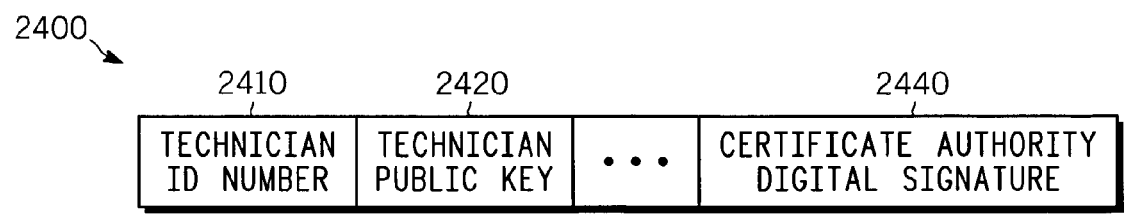
FIG. 24 is a block diagram illustrating a service technician certificate in accordance with an embodiment of the present invention.

FIG. 21 illustrates a physical implementation of, and FIG. 22 illustrates a corresponding process of, an embodiment of vehicle authentication of a service technician. In step 2210, a service technician 2102 access the vehicle 100 via a secure physical token 2104. FIG. 23 shows a potential embodiment of the secure physical token 2104. The secure physical token 2104 stores a technician identification number 2302 uniquely identifying the service technician 2102 and additionally stores a technician private key 2304 of the service technician 2102. The secure physical token 2104 can be considered a type of component and, as such, includes in some form a computing element, cryptographic algorithms in addition to other elements such as are discussed below. In step 2220, the vehicle obtains a service technician certificate 2400 from the secure physical token 2104, certified by a certificate authority.

FIG. 21 illustrates a physical implementation of, and FIG. 22 illustrates a corresponding process of, an embodiment of vehicle authentication of a service technician. In step 2210, a service technician 2102 access the vehicle 100 via a secure physical token 2104. FIG. 23 shows a potential embodiment of the secure physical token 2104. The secure physical token 2104 stores a technician identification number 2302 uniquely identifying the service technician 2102 and additionally stores a technician private key 2304 of the service technician 2102. The secure physical token 2104 can be considered a type of component and, as such, includes in some form a computing element, cryptographic algorithms in addition to other elements such as are discussed below. In step 2220, the vehicle obtains a service technician certificate 2400 from the secure physical token 2104, certified by a certificate authority 2106. 2440 is generated, for example, in a fashion similar to the component supplier digital signature 1040 as described above.

In step 2240, the vehicle system 104 verifies the service technician certificate 2400 using the certificate authority digital signature 2440 from the service technician certificate 2400 as a verification by, for example, using a root key of the certificate authority that was previously stored in the secure vehicle database 208.

In step 2250, the vehicle system 104 issues a cryptographic challenge to the secure physical token 2104, transferring challenge data such as a randomly generated number to the secure physical token 2104. In step 2260, the secure physical token 2104 encrypts the challenge data using the technician private key 2304 and transfers the encrypted challenge data back to the vehicle system 104. In step 2270, the vehicle system 104 uses the technician public key 2420 from the service technician certificate 2400 to decrypt the challenge data, confirming the authenticity of the technician by determining that the challenge data decrypted by the secure physical token 2104 is identical to the original challenge data before encryption by the vehicle system 104. Upon authenticating the technician, the vehicle system 104 may authorize the technician to perform a service operation on the vehicle, or to pass to a next required event or authorization.

Another novel type of authentication provided herein is technician authentication of a vehicle or component in the vehicle. This is similar to vehicle authentication of a service technician as described above in that a secure device is similarly utilized. However, in this case the service technician authenticates the vehicle or a component therein. The service technician accesses the prospective vehicle and obtains from a certification authority a certification that an authentic vehicle is associated with a cryptographic key. The service technician utilizes the cryptographic key in cryptographic communication with the prospective vehicle via a secure device having limited accessibility but being accessible by the service technician. The service technician determines whether the prospective vehicle is the authentic vehicle based on whether the cryptographic key is successfully utilized in the cryptographic communication. Other aspects of technician authentication of a vehicle are similar to those described above with respect to component authentication of a vehicle or, in the case of technician authentication of a component, similar to those described above with respect to vehicle authentication of a component.

Authorization

Another novel aspect of configuration control as provided herein is authorization. Providing the capability of authentication of a configuration element or service technician as described above makes it possible to authorize a reconfiguration of the vehicle with respect to that configuration element or service technician such as installation or modification of a component or performance of a service operation by a service technician.

One such type of authorization is vehicle authorization of a service technician, which can be generally described as follows. Upon authenticating a service technician as described above, the vehicle accesses a technician database to determine whether the service technician is indicated as authorized to perform the service operation. If the service technician is indicated as authorized to perform the service operation, the vehicle allows the service technician to perform the service operation.

The service technician may be authorized merely based on whether the individual is a member of an organization or class and/or considered reliable. Additionally or alternatively, the service technician may be authorized based on a type of the vehicle, a type of a component involved in the service operation or a function performed in the service operation. The service operation may involve installing the component in the vehicle, removing the component from the vehicle, replacing the component with another component, replacing another component with the component, repairing the component, modifying the component, upgrading the component and adding the component as an upgrade to another component.

The above process may be performed by the vehicle or by a component of the vehicle. The process may be performed by a computing unit authenticating the service technician and accessing the technician database and allowing the service technician to perform the service operation if the service technician is indicated by the technician database as authorized to perform the service operation. The computing unit may be a vehicle computing unit representing the vehicle or a component computing unit of a component of the vehicle.

Referring back to FIG. 21, a technician database 2108 is also provided which maintains a list of service technicians authorized to perform a service operation on the vehicle 100. One of ordinary skill will recognize that such a database can be implemented in a variety of ways, depending on the needs and circumstances at hand. For example, the technician database 2108 may maintain a list of service technicians associated with a set of functions each is authorized to perform with respect to specified types of components for specified types of vehicles. Such functions may include, for example, installing a component in the vehicle, removing a component in the vehicle, replacing a component in the vehicle, repairing a component in the vehicle, modifying a component in the vehicle, and upgrading a component in the vehicle.

Another novel type of authorization provided herein is authorization of reconfiguration of a vehicle, which can be generally described as follows. The vehicle authenticates a component for a reconfiguration function, such as described above in vehicle authentication of a component. The vehicle accesses a configuration database to determine whether the reconfiguration function is authorized. Upon determining that the reconfiguration function is authorized, the vehicle allows the reconfiguration function to be performed. The reconfiguration function may be authorized based on a type of the vehicle, a type of the component or a combination of configuration elements in a current configuration of the vehicle.

The above process may be performed by a computing unit accessing the configuration database and allowing the reconfiguration function to be performed upon determining that the reconfiguration function is authorized. The reconfiguration function may involve installing the component in the vehicle, removing the component from the vehicle, replacing the component with another component in the vehicle, replacing another component in the vehicle with the component, modifying the component, upgrading the component and rendering the component operable.

More specifically, in a potential embodiment of authorization of reconfiguration of a vehicle, the vehicle system 104 of the vehicle 100 first authenticates a component 400 by performing the process described in FIG. 9. Upon authenticating the component 400, the vehicle system 104 accesses the configuration database 208 to determine whether a reconfiguration function, such as installation of the component 400 into the vehicle 100, is authorized for the vehicle 100 having the specific configuration of configuration elements defined in the configuration database 208.

The configuration database 208 stores information on all configuration elements of the vehicle configuration, thus representing the entire configuration of the vehicle at a given point in time. The configuration database 208 further includes data indicating what components, service operations, and so forth are authorized in the vehicle 100 having an existing configuration as defined therein. The configuration database 208 can be implemented a variety of ways, such as via conventional database structures, lists, rules, and so forth.

Configuration Management

Yet another novel aspect of configuration control as provided herein involves maintaining a configuration history of a vehicle. The vehicle maintains a record of configuration elements of the configuration of the vehicle and maintains a history of configuration functions for each of the configuration elements. The history may include a record of corresponding times at which the configuration functions have occurred, which can be utilized to determine a configuration of the vehicle at a time of an event.

The history may also include a type of each configuration function. The configuration functions may include, for example, the functions of installing the configuration element in the vehicle, removing the configuration element from the vehicle, replacing the configuration element with another configuration element in the vehicle, replacing another configuration element in the vehicle with the configuration element, modifying the configuration element, repairing the configuration element, upgrading the configuration element or rendering the configuration element operable.

In another variation of the configuration history concept, the vehicle maintains a record of configuration elements of the configuration of the vehicle and also maintains a service history of at least one service technician performing a service operation with respect to a corresponding one of the configuration elements in the configuration. The service history may include maintaining a record of a corresponding time at which the service technician performed the service operation, which may be utilized to determine a service technician having most recently performed a service operation at a time of an event.

The service history may also maintain a type of each service operation. The service operations may include, for example, installing a configuration element in the vehicle, removing the configuration element from the vehicle, replacing the configuration element with another configuration element, replacing another configuration element with the configuration element, repairing the configuration element, modifying the configuration element, upgrading the configuration element or adding the configuration element as an upgrade to another configuration element.

More specifically, in a potential embodiment of this concept the vehicle system 104 maintains in the configuration database 206 a record of configuration elements of a configuration of the vehicle 100. The configuration database 206 further includes a history of configuration functions for each of the configuration elements along with a record of corresponding times at which the configuration functions have occurred. This record and/or history or aspects thereof may be maintained in a way so as to provide nonrepudiation of the data therein. For example, the data may be signed by an entity bearing some responsibility related to the data with a digital signature of that entity so that the entity cannot later repudiate the data. By accessing the configuration database 206, it can thus be determined what the configuration of the vehicle at the time of an event, such as an accident, malfunction or other significant event. This can be useful in diagnosis for repair, determination of liability and so forth.

Additionally, the configuration database 206 maintains a service history of service technicians that have performed a service operation with respect to a configuration element in the configuration. The configuration database 206 further maintains a record of a corresponding time at which each of the service technicians performed a service operation. This record and/or service history or aspects thereof may be maintained in a way so as to provide nonrepudiation of the data therein. For example, the data may be signed by an entity bearing some responsibility related to the data with a digital signature of that entity so that the entity cannot later repudiate the data. By accessing the configuration database 206, it can thus be determined what service technician had most recently performed a service operation at a time of an event such as an accident, malfunction or other significant event. This can also be useful in diagnosis for repair, determination of liability and so forth.

The invention has been described with reference to one or more illustrative embodiments. However, further modifications and improvements may occur to those skilled in the art. The claims are intended to cover all such modifications and changes as fall withing the scope and spirit of the invention.

The invention claimed is:

1. A method for authentication of a prospective vehicle by a component for use in the prospective vehicle, the method performed by the component and comprising the steps of:

accessing, by the component, the prospective vehicle, wherein the component has at least a component computing unit, a component cryptographic unit, a component memory, the component memory storing data related to the component;

obtaining from a certification authority a certification that an authentic vehicle is associated with a cryptographic key;

utilizing, by the component cryptographic unit, the cryptographic key in cryptographic communication with a cryptographic unit of the prospective vehicle; and determining, by the component, whether the prospective vehicle is the authentic vehicle based on whether the cryptographic key is successfully utilized in the cryptographic communication.

2. The method of claim 1 wherein the certification comprises a digital certificate.

3. The method of claim 1 wherein the certification comprises a digital signature of the certification authority.

4. The method of claim 1 wherein the certification authority is authenticated by a second certification authority.

5. The method of claim 1, further comprising the step of determining that the certification authority is authorized to certify the authentic vehicle.

6. The method of claim 1 wherein the step of obtaining the certification comprises obtaining a certification that a vehicle having an identified attribute is associated with the cryptographic key.

7. The method of claim 1 wherein the authentic vehicle has a first cryptographic key and the cryptographic key with which the certification associates the authentic vehicle is a second cryptographic key corresponding to the first cryptographic key.

8. The method of claim 7 wherein the first cryptographic key is accessible only by the authentic vehicle.

9. The method of claim 7 wherein the first cryptographic key is a private cryptographic key of the authentic vehicle and the second cryptographic key is a public cryptographic key of the authentic vehicle.

10. The method of claim 1, further comprising the step of allowing the prospective vehicle to operate the component upon determining the prospective vehicle is the authentic vehicle.

11. A system for authentication of a proposed vehicle by a component for use in the prospective vehicle, the system comprising:

a component obtaining from a certification authority a certification that an authentic vehicle is associated with a cryptographic key, the component comprising a cryptographic unit utilizing the cryptographic key in cryptographic communication with a cryptographic unit of the prospective vehicle; and a computing unit determining whether the prospective vehicle is die authentic vehicle based on whether the cryptographic key is successfully utilized in the cryptographic communication.

12. The system of claim 11 wherein the certification comprises a digital certificate.

13. The system of claim 11 wherein the certification comprises a digital signature of the certification authority.

14. The system of claim 11 wherein the certification authority is authenticated by a second certification authority.

15. The system of claim 11, wherein the computing unit determines that the certification authority is authorized to certify the authentic vehicle.

16. The system of claim 11 wherein the certification comprises a certification that a vehicle having an identified attribute is associated with the cryptographic key.

17. The system of claim 11 wherein the authentic vehicle has a first cryptographic key and the cryptographic key with which the certification associates the authentic vehicle is a second cryptographic key corresponding to the first cryptographic key.

18. The system of claim 17 wherein the private cryptographic key is accessible only by the authentic vehicle.

19. The system of claim 17 wherein the first cryptographic key is a private cryptographic key of the authentic vehicle and the second cryptographic key is a public cryptographic key of the authentic vehicle.

20. The system of claim 11 wherein the computing unit allows the prospective vehicle to operate the component upon determining the prospective vehicle is the authentic vehicle.

* * * * *

UNITED STATES PATENT AND TRADEMARK OFFICE
CERTIFICATE OF CORRECTION

| | | |
|---|---|---|
| PATENT NO. | : 7,131,005 B2 | Page 1 of 1 |
| APPLICATION NO. | : 10/184760 | |
| DATED | : October 31, 2006 | |
| INVENTOR(S) | : Levenson et al. | |

It is certified that error appears in the above-identified patent and that said Letters Patent is hereby corrected as shown below:

Col. 8 line 50, change "502" to --802--
Col. 28, line 8, change "die" to -- the--

Signed and Sealed this

First Day of May, 2007

JON W. DUDAS
*Director of the United States Patent and Trademark Office*